(12) United States Patent
Yang et al.

(10) Patent No.: US 9,763,264 B2
(45) Date of Patent: Sep. 12, 2017

(54) METHOD FOR TRANSMITTING A FEEDBACK SIGNAL AND APPARATUS FOR SAME

(71) Applicant: LG ELECTRONICS INC., Seoul (KR)

(72) Inventors: Suckchel Yang, Seoul (KR); Yunjung Yi, Seoul (KR); Joonkui Ahn, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 97 days.

(21) Appl. No.: 14/760,092

(22) PCT Filed: Feb. 6, 2014

(86) PCT No.: PCT/KR2014/001039
§ 371 (c)(1),
(2) Date: Jul. 9, 2015

(87) PCT Pub. No.: WO2014/123379
PCT Pub. Date: Aug. 14, 2014

(65) Prior Publication Data
US 2015/0358986 A1 Dec. 10, 2015

Related U.S. Application Data

(60) Provisional application No. 61/761,239, filed on Feb. 6, 2013, provisional application No. 61/786,554, filed (Continued)

(51) Int. Cl.
*H04J 3/00* (2006.01)
*H04W 72/12* (2009.01)
(Continued)

(52) U.S. Cl.
CPC ....... *H04W 72/1289* (2013.01); *H04L 1/1812* (2013.01); *H04L 1/1854* (2013.01);
(Continued)

(58) Field of Classification Search
CPC ......... H04W 72/1289; H04W 72/1205; H04W 72/12; H04L 1/1812; H04L 1/1854; H04L 5/0055; H04L 5/0092; H04L 5/14
(Continued)

(56) References Cited

U.S. PATENT DOCUMENTS

2009/0213769 A1 8/2009 Shen et al.
2010/0195587 A1 8/2010 Ratasuk et al.
(Continued)

FOREIGN PATENT DOCUMENTS

EP 2434818 A1 3/2012
EP 2538734 A1 12/2012
(Continued)

OTHER PUBLICATIONS

China Telecom, "Discussion on spectral efficiency improvement for small cell enhancements", 3GPP TSG RAN WG1 Meeting #72, Agenda Item: 7.3.5.2, St. Julian's, Malta, Jan. 28-Feb. 1, 2013, pp. 1-7, R1-130354.
(Continued)

*Primary Examiner* — Thai Hoang
(74) *Attorney, Agent, or Firm* — Birch, Stewart, Kolasch & Birch, LLP

(57) ABSTRACT

The present invention relates to a method for transmitting a signal in a wireless communication system and an apparatus for same, and comprises the steps of: receiving a plurality of data signals through a plurality of subframes; and transmitting acknowledgement (ACK)/negative ACK (NACK) signals with respect to the plurality of data signals, wherein when at least one subframe from among the plurality of subframes is a special subframe, an ACK/NACK signal with respect to a first data signal that is received through the at least one subframe is transmitted from an uplink subframe different from an uplink subframe from which an ACK/
(Continued)

NACK signal with respect to a second data signal from among the plurality of data signals, not including the first data signal, is transmitted.

20 Claims, 16 Drawing Sheets

Related U.S. Application Data on Mar. 15, 2013, provisional application No. 61/808,616, filed on Apr. 4, 2013, provisional application No. 61/821,252, filed on May 9, 2013, provisional application No. 61/837,150, filed on Jun. 19, 2013.

(51) Int. Cl.
*H04L 5/14* (2006.01)
*H04L 1/18* (2006.01)
*H04L 5/00* (2006.01)
*H04W 88/02* (2009.01)

(52) U.S. Cl.
CPC .......... *H04L 5/0055* (2013.01); *H04L 5/0092* (2013.01); *H04L 5/14* (2013.01); *H04W 72/12* (2013.01); *H04W 72/1205* (2013.01); *H04L 5/0048* (2013.01); *H04W 88/02* (2013.01)

(58) Field of Classification Search
USPC .................................................. 370/276–280
See application file for complete search history.

(56) References Cited

U.S. PATENT DOCUMENTS

| | | | |
|---|---|---|---|
| 2011/0070845 A1 | 3/2011 | Chen et al. | |
| 2011/0268059 A1* | 11/2011 | Li | H04L 1/1812 370/329 |
| 2012/0033587 A1* | 2/2012 | Papasakellariou | H04J 13/00 370/277 |
| 2012/0039275 A1* | 2/2012 | Chen | H04L 1/1607 370/329 |
| 2012/0208583 A1* | 8/2012 | Chung | H04L 5/001 455/509 |
| 2012/0236771 A1* | 9/2012 | Luo | H04L 1/1607 370/311 |
| 2013/0016686 A1 | 1/2013 | Li et al. | |
| 2013/0039387 A1* | 2/2013 | Qu | H04L 5/0051 375/141 |
| 2013/0051355 A1 | 2/2013 | Hong | |
| 2013/0121130 A1* | 5/2013 | Ko | H04L 1/0027 370/208 |
| 2013/0170407 A1* | 7/2013 | Liang | H04L 1/1607 370/280 |
| 2013/0215803 A1* | 8/2013 | Lee | H04L 1/1607 370/280 |
| 2013/0265914 A1 | 10/2013 | Ahn et al. | |
| 2014/0161088 A1 | 6/2014 | Seo et al. | |
| 2014/0185539 A1 | 7/2014 | Seo et al. | |
| 2014/0233541 A1* | 8/2014 | Kim | H04L 1/1607 370/336 |
| 2015/0146588 A1* | 5/2015 | Park | H04L 5/0055 370/280 |
| 2015/0189622 A1 | 7/2015 | Jang et al. | |

FOREIGN PATENT DOCUMENTS

| | | |
|---|---|---|
| KR | 10-2011-0103457 A | 9/2011 |
| KR | 10-2011-0122033 A | 11/2011 |
| WO | WO 2012/064078 A2 | 5/2012 |
| WO | WO 2012/081867 A2 | 6/2012 |
| WO | WO 2012/138149 A2 | 10/2012 |
| WO | WO 2013/015613 A2 | 1/2013 |

OTHER PUBLICATIONS

New Postcom, "Evaluation assumptions for enhancement for UE-specific RS and control signaling", 3GPP TSG RAN WG1 Meeting #72, Agenda Item: 7.3.5.2, St. Julian's, Malta, Jan. 28-Feb. 1, 2013, 6 pages, R1-130186.

Catt, "Overhead reduction for spectrum efficiency improvement," 3GPP TSG RAN WG1 Meeting #72, R1-130057, St. Julian's, Malta, Jan. 28-Feb. 1, 2013, pp. 1-4.

Ericsson, "Remaining issues for TDD ACK/NAK bundling and PUSCH," TSG-RAN WG1 #53bis, Warsaw, Poland, Jun. 30-Jul. 4, 2008 (retrieved on Jun. 25, 2008), R1-082462, 4 pages.

ETSI, "LTE; Evolved Universal Terrestrial Radio Access (E-UTRA); Physical channels and modulation (3GPP TS 36.211 version 10.0.0 Release 10)," ETSI TS 136 211 V10.0.0, Jan. 2011, pp. 1-104 (105 pages).

Huawei et al., "Analysis and initial evaluation results for overhead reduction and control signaling enhancements," 3GPP TSG RAN WG1 Meeting #72, R1-130022, St. Julian's, Malta, Jan. 28-Feb. 1, 2013, 6 pages.

Huawei et al., "PDCCH enhancement in Rel-11 carrier aggregation," 3GPP TSG RAN WG1 Meeting #66, Athens, Greece, Aug. 22-26, 2011 (retrieved on Aug. 16, 2011), R1-112461, 2 pages.

NEC Group, "Correction to EPDCCH monitoring subframes," 3GPP TSG-RAN WG1 #72, St. Julian's, Malta, Jan. 28-Feb. 1, 2013, R1-130360, 3 pages.

Qualcomm Incorporated, "Overhead Reduction," 3GPP TSG RAN WG1 #72, R1-130594, Jan. 28-Feb. 1, 2013, St Julian's, Malta, pp. 1-4.

\* cited by examiner

PUCCH format 1a and 1b structure (normal CP case)

* When ACK/NACK is transmitted on a PUSCH, UE can be aware of missing of the PDCCH by comparing DAI (DL-DAI) with DAI (UL-DAI) on a UL grant PDCCH.

FIG. 15
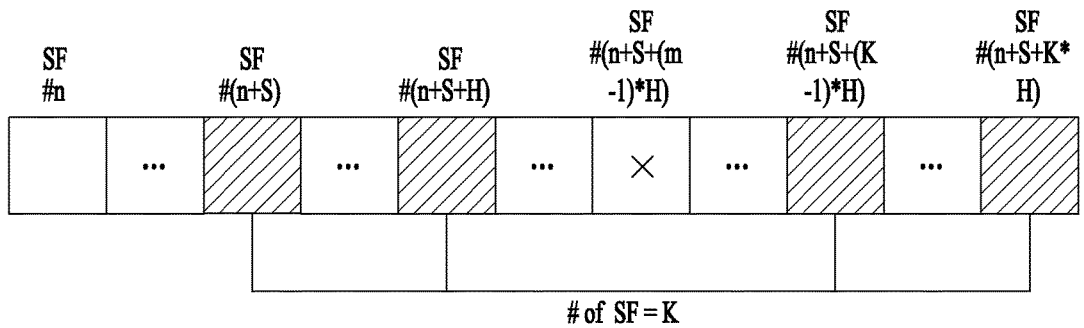
(a) SF-skipping
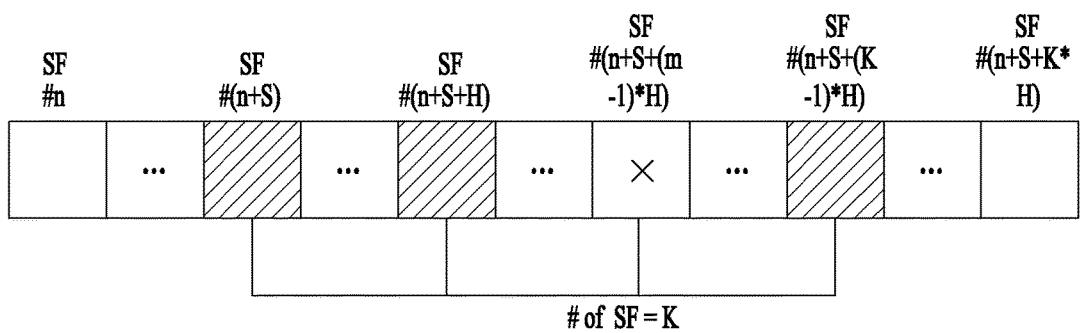
(b) SF-omitting
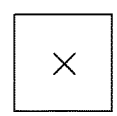 Special X-SF and / or indicated-O SF
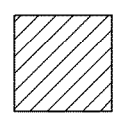 Multi-SF scheduled SF FIG. 16
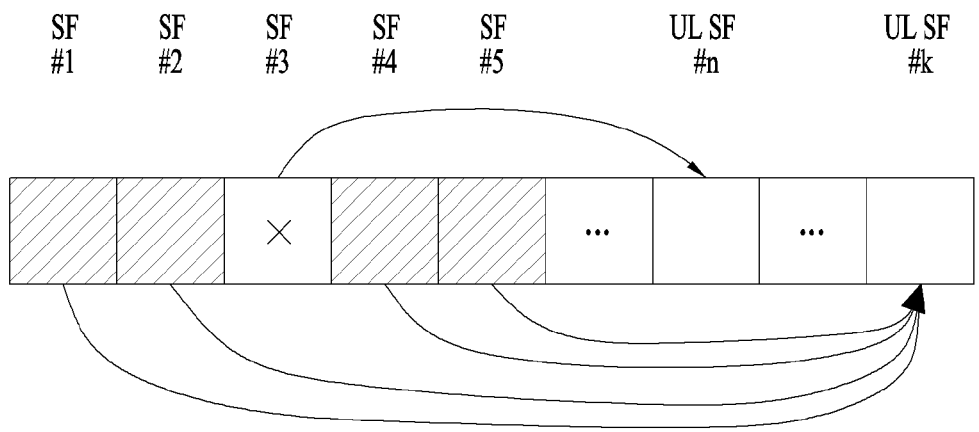
(a) A-1 scheme
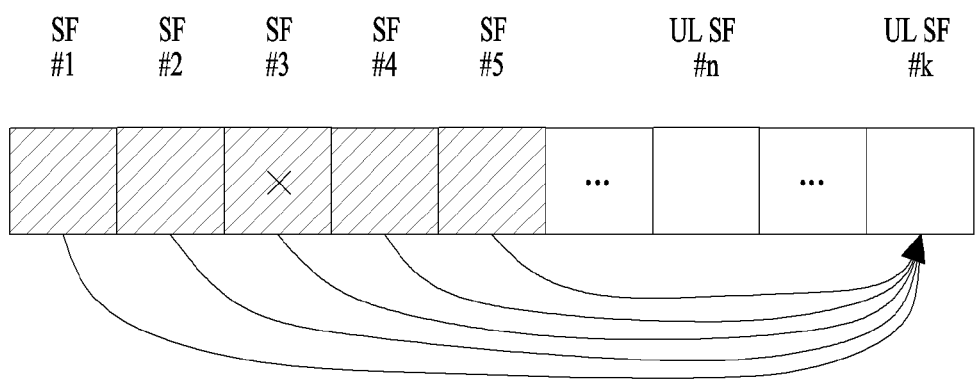
(b) A-2 scheme
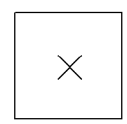 Special X-SF and / or indicated-O SF
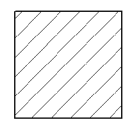 Multi-SF window for A / N feedback FIG. 17
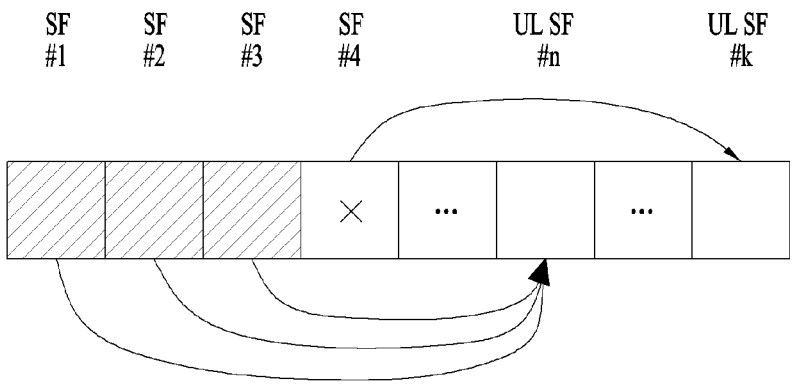
(a) B-1 scheme
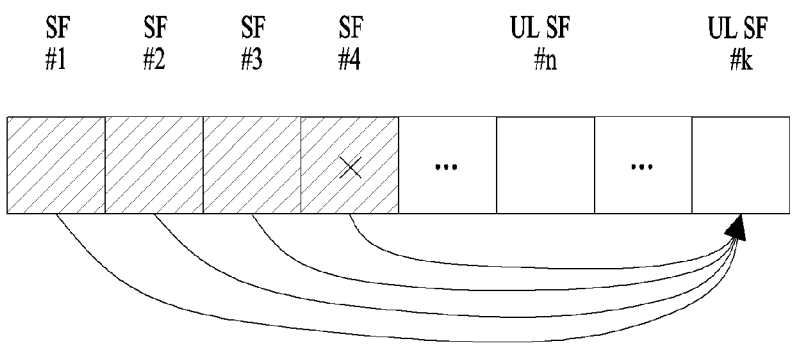
(b) B-2 scheme
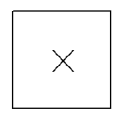 Special X-SF and / or indicated-O SF
 Multi-SF window for A / N feedback FIG. 18
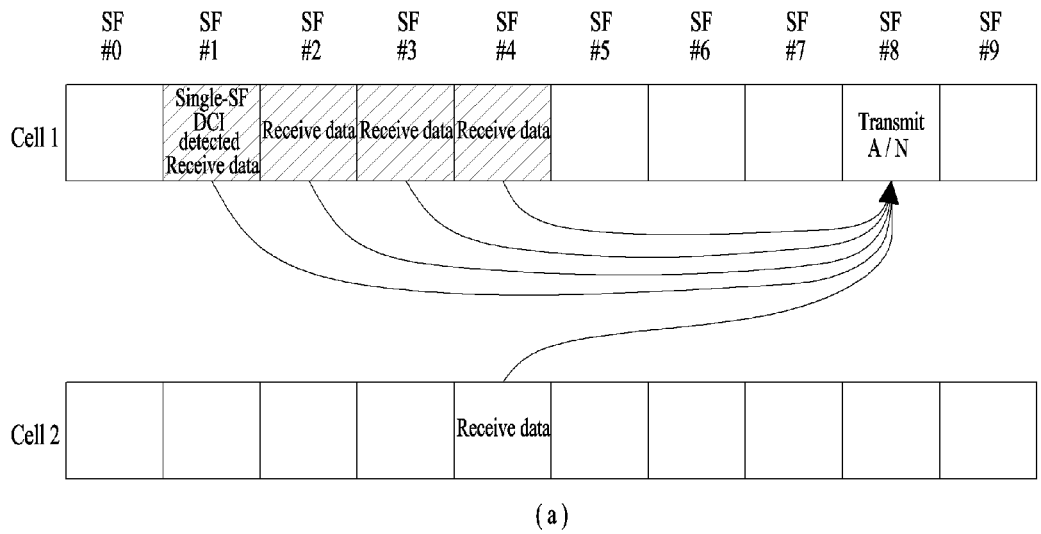
(a)
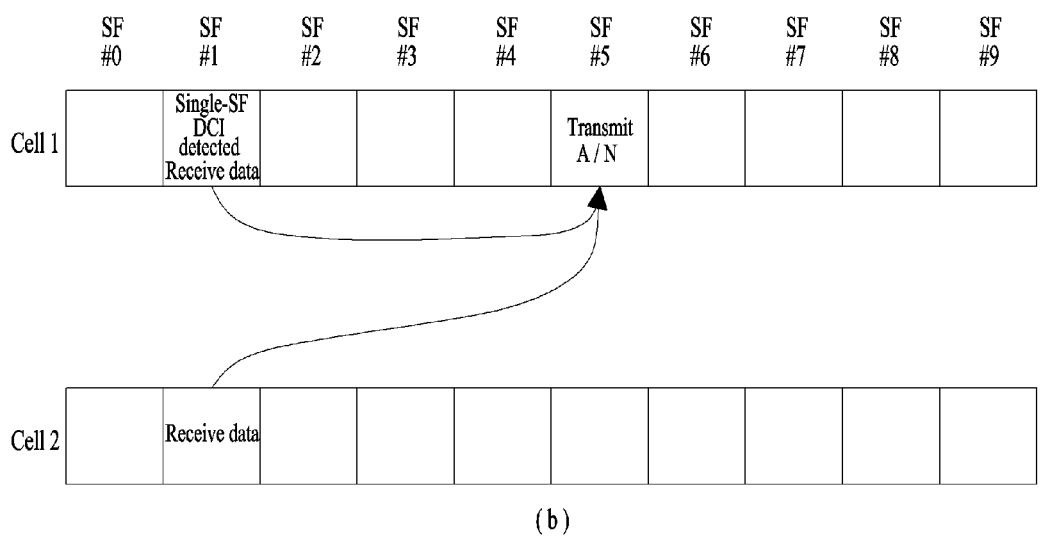
(b)
 Multi-SF window for A / N feedback
\* Multi-SF scheduling is configured for cell 1
\* Multi-SF DCI is configured to be transmitted in SF #1 or #6

METHOD FOR TRANSMITTING A FEEDBACK SIGNAL AND APPARATUS FOR SAME

TECHNICAL FIELD

The present invention relates to a wireless communication system, more specifically, relates to a method for transmitting and receiving a feedback signal in case of multi-subframe scheduling and an apparatus for the same.

BACKGROUND ART

Wireless communication systems are widely developed to provide various kinds of communication services including audio communications, data communications and the like. Generally, a wireless communication system is a kind of a multiple access system capable of supporting communications with multiple users by sharing available system resources (e.g., bandwidth, transmission power, etc.). For instance, multiple access systems include CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE

Technical Problem

An object of the present invention is to provide a method and apparatus for effectively transmitting and receiving a signal in a wireless communication system.

Another object of the present invention is to provide a method and apparatus for effectively transmitting and receiving a feedback signal when a plurality of data signals are scheduled using one control information in a wireless communication system.

Another object of the present invention is to provide a method and apparatus for effectively transmitting and receiving a feedback signal when a plurality of data signals are scheduled using one control information in a wireless communication system in which a plurality of cells are carrier aggregated.

Another object of the present invention is to provide a method and apparatus for effectively signaling downlink control information for scheduling a plurality of data signals in a wireless communication system.

It is to be understood that both the foregoing general description and the following detailed description of the present invention are exemplary and explanatory and are intended to provide further explanation of the invention as claimed.

Technical Solution

In an aspect of the present invention, provided herein is a method for transmitting a signal by a user equipment in a wireless communication system, the method comprising: receiving a plurality of data signals in a plurality of subframes; and transmitting an acknowledgement (ACK)/negative ACK (NACK) signal in response to the plurality of data signals, wherein, when at least one subframe of the plurality of subframes corresponds to a specific subframe, an ACK/NACK signal for a first data signal received in the at least one subframe is transmitted in an uplink subframe different from an uplink subframe for transmitting an ACK/NACK signal for a second data signal except for the first data signal from among the plurality of data signals.

In another aspect of the present invention, provided herein is a user equipment in a wireless communication system, the user equipment comprising: a radio frequency (RF) unit; and a processor, wherein the processor is configured to: receive a plurality of data signals in a plurality of subframes through the RF unit, and transmit an acknowledgement (ACK)/negative ACK (NACK) signal in response to the plurality of data signals through the RF unit, wherein, when at least one subframe of the plurality of subframes corresponds to a specific subframe, an ACK/NACK signal for a first data signal received in the at least one subframe is transmitted in an uplink subframe different from an uplink subframe for transmitting an ACK/NACK signal for a second data signal except for the first data signal from among the plurality of data signals.

Preferably, the specific subframe may comprise at least a subframe configured for a multicast-broadcast single-frequency network (MBSFN), or a subframe configured to receive a physical multicast channel (PMCH), or a subframe configured to transmit a positioning reference signal (PRS), or a subframe comprising a downlink period, a guard period, and an uplink period, or a subframe for transmitting a physical broadcast channel (PBCH) signal, or a subframe configured to transmit system information, or a subframe configured to transmit a paging signal, or a subframe configured to transmit a synchronization signal, or a subframe configured to perform semi-persistent scheduling, or a subframe configured to be available for physical random access channel (PRACH) transmission, or a subframe configured not to transmit demodulation reference signal (DMRS), or a subframe configured to transmit a channel state information-reference signal (CSI-RS).

Preferably, when a number of ACK/NACK signals for the second data signal is plural, the ACK/NACK signals for the second data signal may be represented as one bit through a logical AND operation.

Preferably, when a number of ACK/NACK signals for the second data signal is plural, the ACK/NACK signals for the second data signal may be transmitted using a channel selection scheme, and each of the ACK/NACK signals for the second data signal may be allocated from hybrid automatic repeat request-ACK (HARQ-ACK)(0) of a channel selection mapping table.

Preferably, when the number of ACK/NACK signals for the second data signal is two, the channel selection mapping table may be given according to given according to the following table:

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission | where $n^{(1)}_{PUCCH,i}$ may represent a PUCCH resource index corresponding to an $i^{th}$ PUCCH resource, and b(0)b(1) may represent bit values corresponding to a complex modulation value.

Preferably, when the number of ACK/NACK signals for the second data signal is three, the channel selection mapping table may be given according to given according to the following table:

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | | where $n_{PUCCH,i}^{(1)}$ may represent a PUCCH resource index corresponding to an $i^{th}$ PUCCH resource, and b(0)b(1) may represent bit values corresponding to a complex modulation value.

Preferably, when the number of ACK/NACK signals for the second data signal is four, the channel selection mapping table may be given according to given according to the following table:

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | | where $n_{PUCCH,i}^{(1)}$ may represent a PUCCH resource index corresponding to an $i^{th}$ PUCCH resource, and b(0)b(1) may represent bit values corresponding to a complex modulation value.

Preferably, a resource for the ACK/NACK signals for the second data signal may be determined using a physical uplink control channel (PUCCH) resource linked to downlink control information for scheduling the plurality of data signals or a PUCCH resource set predetermined through high layer signaling.

Preferably, when a number of ACK/NACK signals for the second data signal is plural, the ACK/NACK signals for the second data signal may be transmitted using physical uplink control channel (PUCCH) format 3, and each of the ACK/NACK signals for the second data signal may be allocated from a most significant bit (MSB) of a payload of the PUCCH format 3.

Preferably, a resource for the ACK/NACK signals in response to the second data signal may be signaled through downlink control information for scheduling the plurality of data signals on a primary cell when the wireless communication system is a frequency division duplex (FDD) system, and may be signaled through downlink control information with a downlink association index (DAI) having a value of 1 and scheduling the plurality of data signals on the primary cell when the wireless communication system is a time division duplex (TDD) system.

Preferably, when the wireless communication system is a TDD system, an ACK/NACK signal for M data signals received in M downlink subframes may be transmitted in one uplink subframe, and a number of the plurality of data signals may be a multiple of M.

Preferably, when the wireless communication system is a TDD system, an ACK/NACK signal for M data signals received in M downlink subframes may be transmitted in one uplink subframe, and the M data signals may comprise the plurality of data signals.

Preferably, a DAI value included in downlink control information for scheduling the plurality of data signals may indicate an order of an initial data signal of the plurality of data signals within the M data signals.

Preferably, when a number of the plurality of data signals is K and the DAI value included in the downlink control information for scheduling the plurality of data signals is N, an DAI value for the plurality of data signals may be given from N to N+K−1.

Advantageous Effects

According to the present invention, a signal may be effectively transmitted and received in a wireless communication system.

According to the present invention, a feedback signal may be effectively transmitted and received when a plurality of data signals are scheduled using one control information in a wireless communication system.

According to the present invention, a feedback signal may be effectively transmitted and received when a plurality of data signals are scheduled using one control information in a wireless communication system in which a plurality of cells are carrier aggregated.

In addition, according to the present invention, downlink control information for scheduling a plurality of data signals may be effectively signaled in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 15 illustrates a multi-SF scheduling method according to the present invention.

FIGS. 16 and 17 illustrate A/N feedback transmitting methods according to the present invention.

FIG. 18 illustrates an A/N transmitting method when a plurality of cells are carrier-aggregated (CA) according to the present invention.

BEST MODEL

The following embodiments of the present invention may be applied to a variety of wireless access technologies such as code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be implemented by wireless (or radio) technology such as Institute of Electrical and Electronics Engineers (IEEE) 802.11 (Wi-Fi), IEEE 802.16 (WiMAX), IEEE 802-20, and evolved UTRA (E-UTRA). UTRA is a part of universal mobile telecommunications system (UMTS). $3^{rd}$ generation partnership project (3GPP) long term evolution (LTE) is a part of E-UMTS (Evolved UMTS), which uses E-UTRA. LTE-Advanced (LTE-A) is an evolved version of 3GPP LTE.

For clarity of explanations, the following description focuses on 3GPP LTE(-A) system. However, technical features of the present invention are not limited thereto. Further, a particular terminology is provided for better understanding of the present invention. However, such a particular terminology may be changed without departing from the technical spirit of the present invention. For example, the present invention may be applied to a system in accordance with a 3GPP LTE/LTE-A system as well as a system in accordance with another 3GPP standard, IEEE 802.xx standard, or 3GPP2 standard.

In a wireless access system, a UE may receive information from a BS in downlink (DL) and transmit information in uplink (UL). The information transmitted or received by the UE may include data and various control information. In addition, there are various physical channels according to the type or use of the information transmitted or received by the UE.

In the present invention, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), a base transceiver system (BTS), an access point (AP), a processing server (PS), a transmission point (TP), etc. In the present invention, a BS may be interchangeably referred to as an eNB.

Figure 1:
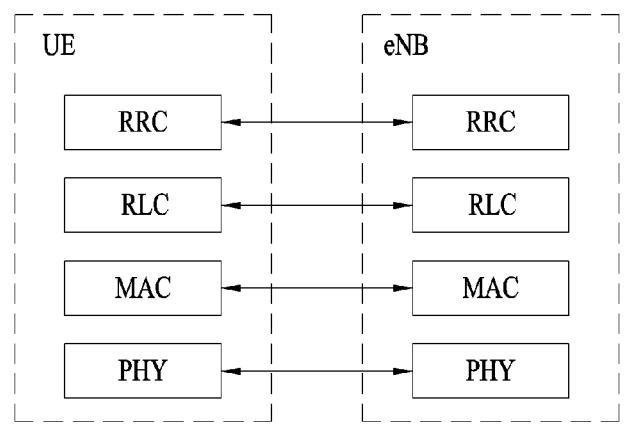
FIG. 1 illustrates layers of a radio protocol.

FIG. 1 illustrates layers of a radio protocol.

The physical layer (PHY) which is a first layer provides information transfer services to the upper layers using a physical channel. The PHY layer is connected to the upper medium access control (MAC) layer through a transport channel, and data between the MAC layer and the PHY layer is transferred through the transport channel. In this case, the transport channel is roughly divided into a dedicated transport channel and a common transport channel based on whether or not the channel is shared. Furthermore, data is transferred between different PHY layers, i.e., between PHY layers at transmitter and receiver sides.

A second layer may include various layers. The medium access control (MAC) layer serves to map various logical channels to various transport channels, and also performs logical channel multiplexing for mapping several logical channels to one transport channel. The MAC layer is connected to a radio link control (RLC) layer, which is an upper layer, through a logical channel, and the logical channel is roughly divided into a control channel for transmitting control plane information and a traffic channel for transmitting user plane information according to the type of information to be transmitted.

The RLC layer of the second layer manages segmentation and concatenation of data received from an upper layer to appropriately adjusts a data size such that a lower layer can send data to a radio section. Also, the RLC layer provides three operation modes such as a Transparent Mode (TM), an Un-acknowledged Mode (UM), and an Acknowledged Mode (AM) so as to guarantee various Quality of Services (QoS) required by each Radio Bearer (RB). In particular, AM RLC performs a retransmission function through an ARQ function for reliable data transmission.

A radio resource control (RRC) layer located at the uppermost portion of a third layer is only defined in the control plane. The RRC layer performs a role of controlling logical channels, transport channels, and physical channels in relation to configuration, re-configuration, and release of radio bearers. Here, the radio bearer denotes a logical path provided by the first and the second layers for transferring data between the UE and the UTRAN. In general, the configuration of the radio bearer refers to a process of stipulating the characteristics of protocol layers and channels required for providing a specific service, and setting each of the detailed parameter and operation methods thereof. The radio bearer is divided into a signaling radio bearer (SRB) and a data radio bearer (DRB), wherein the SRB is used as a path for transmitting RRC messages in the control plane while the DRB is used as a path for transmitting user data in the user plane.

In a wireless access system, a user equipment (UE) may receive information from a base station (BS) in downlink (DL) and transmit information in uplink (UL). The information transmitted or received by the UE may include general data information and various control information. In addition, there are various physical channels according to the type or use of the information transmitted or received by the UE.

Figure 2:
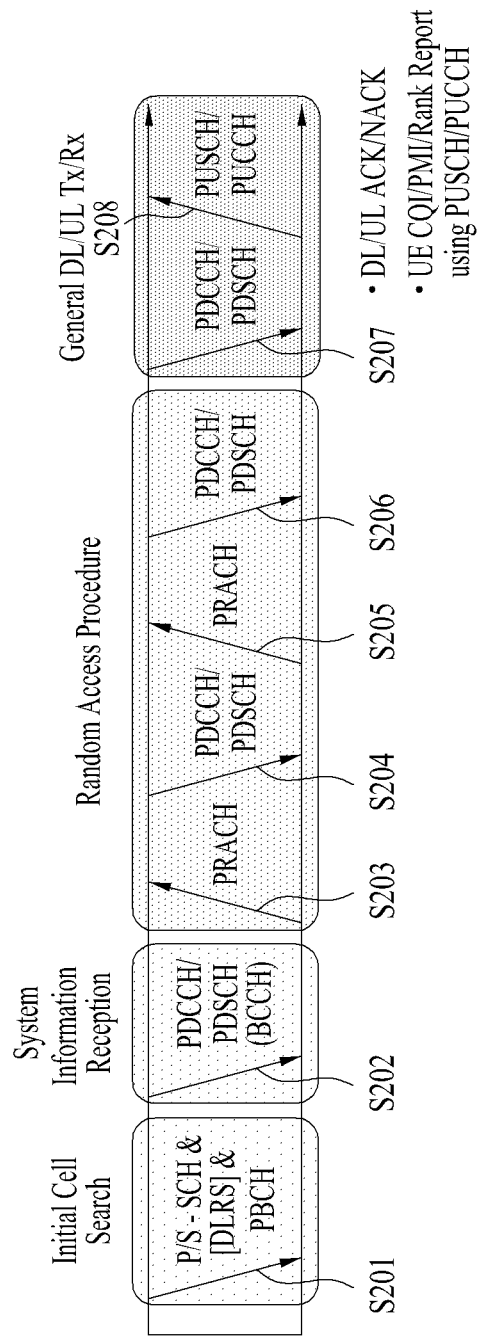
FIG. 2 illustrates physical channels and a general method for transmitting signals on the physical channels in the LTE(-A) system.

FIG. 2 illustrates physical channels and a general method for transmitting signals on the physical channels in the LTE(-A) system.

When a UE is powered on or enters a new cell, the UE performs initial cell search in step S201. The initial cell search involves acquisition of synchronization to a base station. To this end, the UE synchronizes its timing to the base station and acquires information such as a cell identifier (ID) by receiving a primary synchronization channel (P-SCH) and a secondary synchronization channel (S-SCH) from the base station. Then the UE may acquire broadcast information in the cell by receiving a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH in step S202.

To complete access to the base station, the UE may perform a random access procedure such as steps S203 to S206 with the base station. To this end, the UE may transmit a preamble on a physical random access channel (PRACH) (S203) and may receive a response message to the preamble on a PDCCH and a PDSCH associated with the PDCCH (S204). In the case of a contention-based random access, the UE may additionally perform a contention resolution procedure including transmission of an additional PRACH (S205) and reception of a PDCCH signal and a PDSCH signal corresponding to the PDCCH signal (S206).

After the above procedure, the UE may receive a PDCCH and/or a PDSCH from the base station (S207) and transmit a physical uplink shared channel (PUSCH) and/or a physical uplink control channel (PUCCH) to the base station (S208), in a general UL/DL signal transmission procedure. Information that the UE transmits to the base station is referred to as Uplink Control Information (UCI), The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted on a PUCCH periodically. However, if control information and traffic data should be transmitted simultaneously, they may be transmitted on a PUSCH. In addition, the UCI may be transmitted aperiodically on the PUSCH, upon receipt of a request/command from a network.

Figure 3:
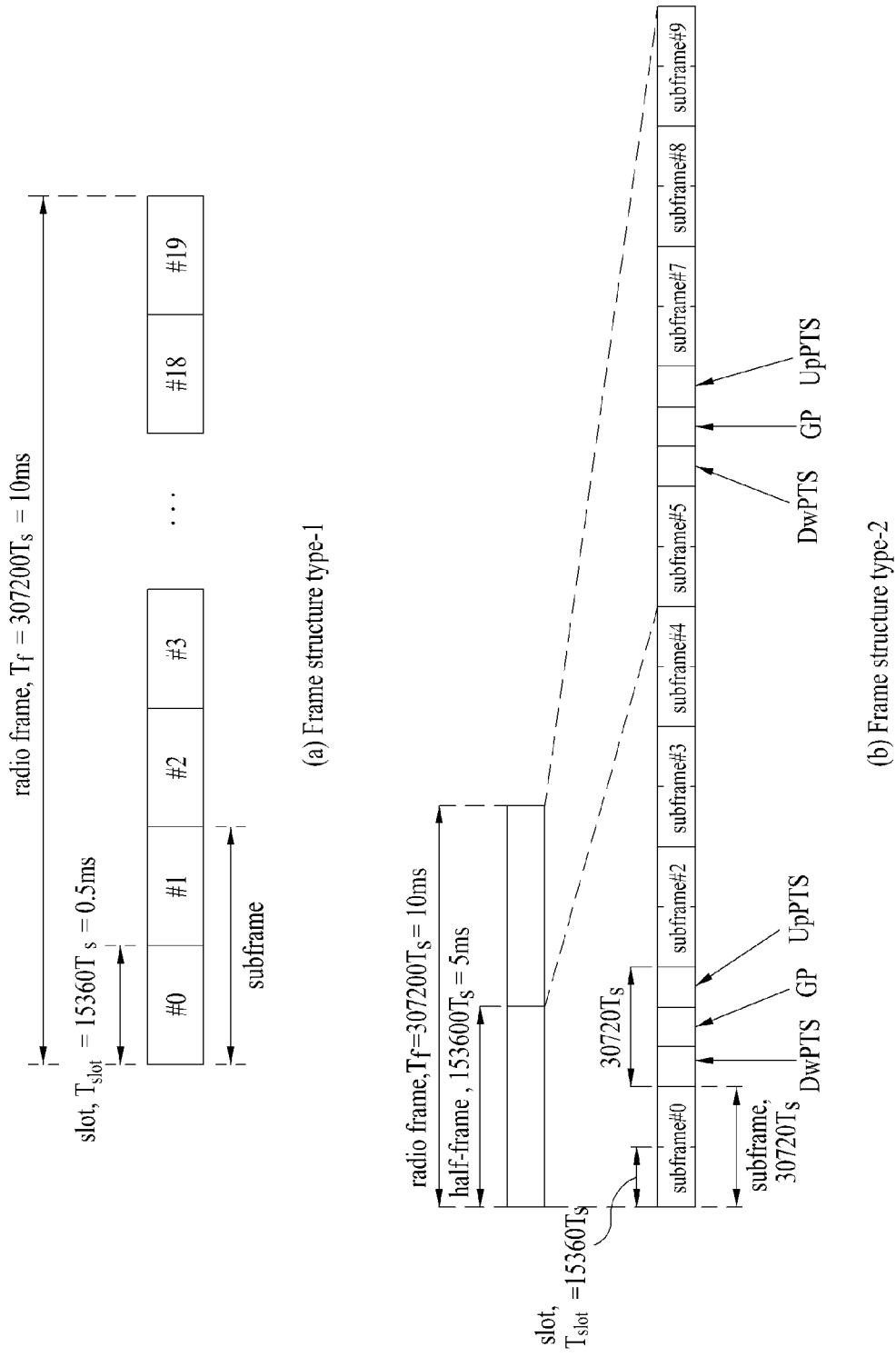
FIG. 3 illustrates a structure of a radio frame used in the LTE(-A) system.

FIG. 3 illustrates a structure of a radio frame used in the LTE(-A) system. In a cellular OFDM radio packet communication system, uplink/downlink data packet transmission is performed in the unit of a subframe (SF), and one subframe is defined as a predetermined duration including a plurality of OFDM symbols. The LTE(-A) system supports a type-1 radio frame structure applicable to frequency division duplex (FDD) and a type-2 radio frame structure applicable to time division duplex (TDD).

FIG. 3(a) shows the structure of the type-1 radio frame. A downlink radio frame includes 10 subframes and one subframe includes two slots in a time domain. A time required to transmit one subframe is referred to as a transmission time interval (TTI). For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol duration. In the LTE(-A) system, since SC-FDMA is used in uplink, an OFDM symbol may be referred to as an SC-FDMA symbol in the present specification, and also may be collectively referred to as a symbol duration. A resource block (RB) as a resource assignment unit may include a plurality of consecutive subcarriers in one slot. A subframe used for a downlink communication is referred to as a downlink subframe, and may be represented by DL SF. A subframe used for an uplink communication is referred to as an uplink subframe, and may be represented by UL SF.

The length of one symbol duration (or the number of OFDM symbols included in one slot) may vary according to a configuration of cyclic prefix (CP). The cyclic prefix (CP) includes an extended CP and a normal CP. For example, if OFDM symbols are configured by the normal CP, the number of OFDM symbols included in one slot may be 7. In case of the extended CP, for example, the number of OFDM symbols included in one slot may be 6.

FIG. 3(b) illustrates a structure of the type-2 radio frame. The type-2 radio frame includes two half frames, and each half frame includes five subframes, a downlink period (e.g. a downlink pilot time slot or DwPTS), a guard period (GP) and an uplink period (e.g. an uplink pilot time slot or UpPTS). One subframe includes two slots. For example, The downlink period (e.g., DwPTS) is used for initial cell search, synchronization or channel estimation of a UE. For example, the uplink period (e.g., UpPTS) is used for channel estimation of a BS and uplink transmission synchronization of a UE. For example, the uplink period (e.g., UpPTS) may be used to transmit a sounding reference signal (SRS) for channel estimation in a base station and to transmit a physical random access channel (PRACH) that carriers a random access preamble for uplink transmission synchronization. The guard period is used to eliminate interference generated in uplink due to multi-path delay of a downlink signal between uplink and downlink. Table 1 shows an example of an uplink-downlink (UL-DL) configuration of subframes within a radio frame in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D represents a downlink subframe (DL SF), U represents an uplink subframe (UL SF), and S represents a special subframe. The special subframe includes a downlink period (e.g. DwPTS), a guard period (e.g. GP), and an uplink period (e.g. UpPTS). Table 2 shows an example of a special subframe configuration.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The above-described radio frame structure is exemplary. Thus, the number of subframes in a radio frame, the number of slots in a subframe, or the number of symbols in a slot may be modified in various ways.

Figure 4:
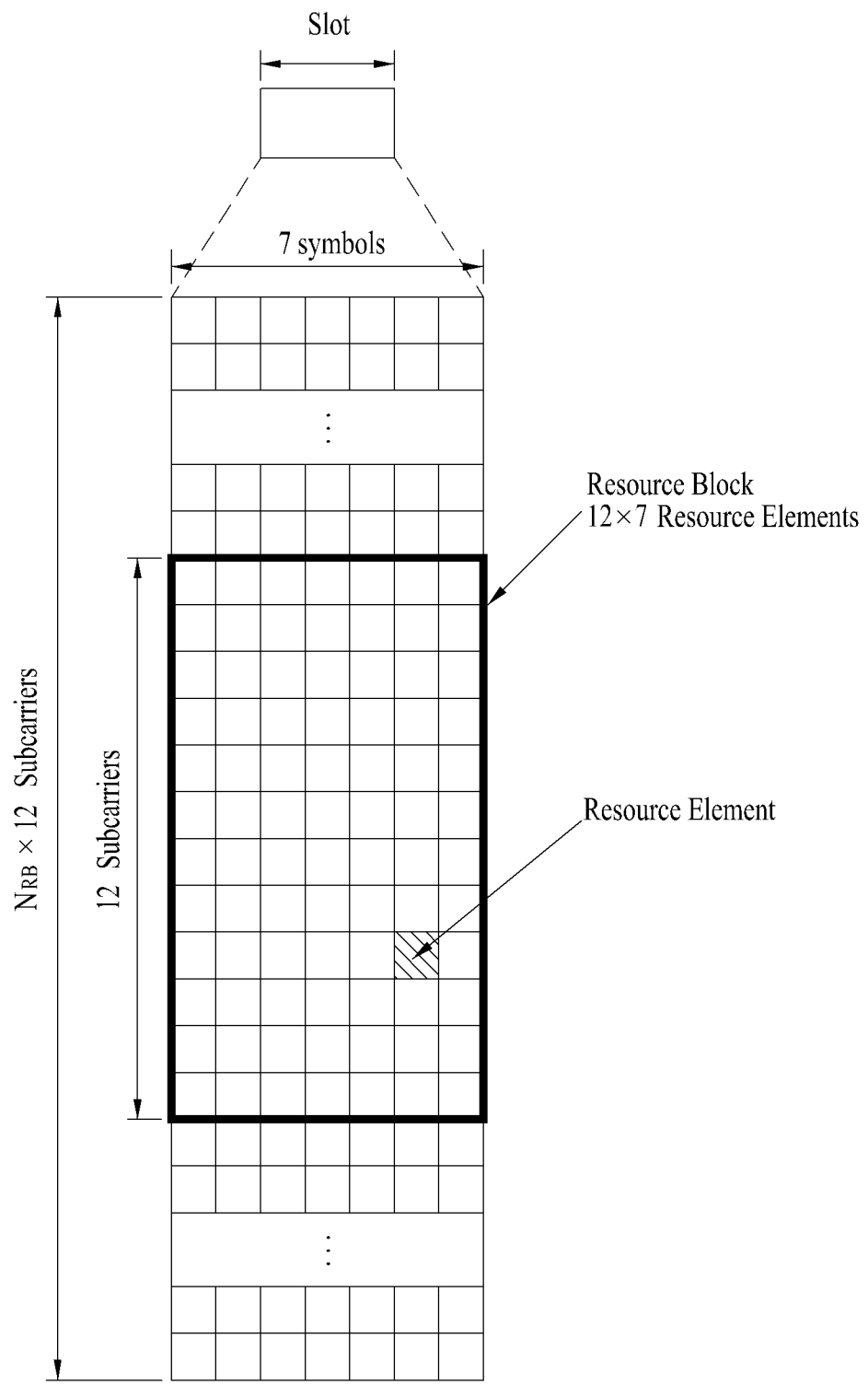
FIG. 4 illustrates a resource grid of one downlink slot.

FIG. 4 illustrates a resource grid of one downlink slot.

Referring to FIG. 4, a downlink slot includes a plurality of OFDM symbols in the time domain. One downlink slot may include 7 OFDM symbols and one resource block (RB) may include 12 subcarriers in the frequency domain. An example as illustrated in FIG. 4 may be applied to a normal CP case, while one downlink slot may include 6 OFDM symbols in the time domain in case of an extended CP case. Each element of the resource grid is referred to as a Resource Element (RE). An RB includes 12×7 REs. The number of RBs in a downlink slot, $N_{DL}$ depends on a downlink transmission bandwidth. The structure of an uplink slot may have the same structure as a downlink slot.

Figure 5:
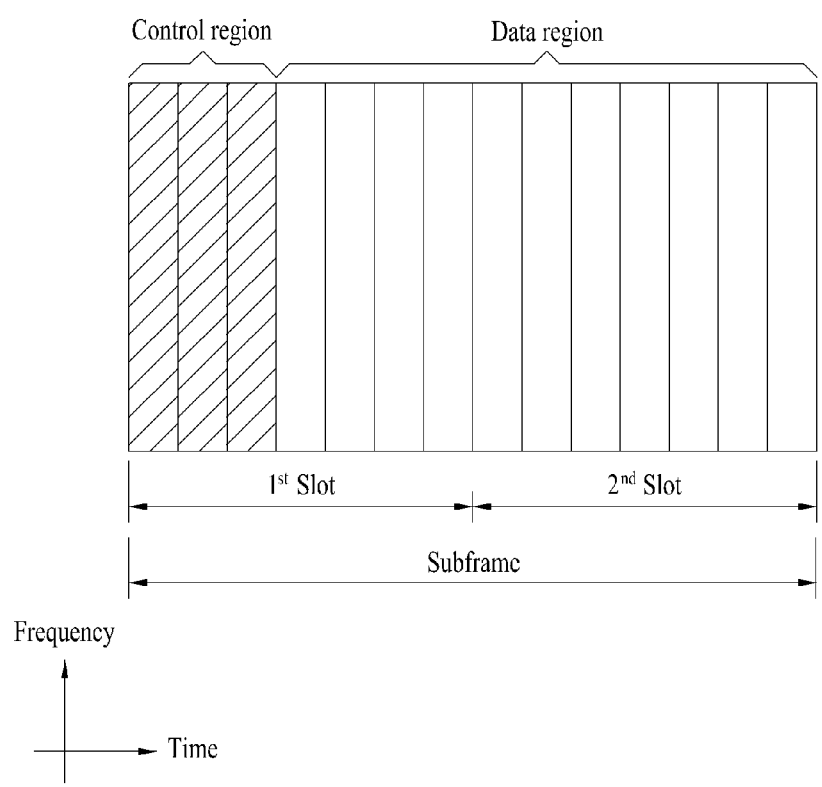
FIG. 5 illustrates a downlink subframe structure.

FIG. 5 illustrates a downlink subframe structure.

Referring to FIG. 5, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first OFDM symbol of a subframe and carries information regarding the number of OFDM symbols used for transmission of control channels within the subframe. The PCFICH is composed of four resource element groups (REGs) each of which is uniformly distributed in a control region based on a cell ID. The PCFICH indicates a value of 1 to 3 (or 2 to 4) and is modulated using quadrature phase shift keying (QPSK).

PDCCH carries a transmission format or resource allocation information of downlink shared channel (DL-SCH), a transmission format or resource allocation information of uplink shared channel (UL-SCH), paging information on paging channel (PCH), system information on DL-SCH, resource allocation information of an upper layer control message such as random access response transmitted on PDSCH, a set of Tx power control commands for individual UEs within a UE group, Tx power control command, activation indication information of Voice over IP (VoIP), etc. The PDCCH is allocated in the first n OFDM symbols (hereinafter, a control region) of a subframe. Here, n is an integer equal to or greater than 1 and is indicated by the PCFICH. Control information transmitted through the PDCCH is referred to as downlink control information (DCI). DCI format is defined as formats 0, 3, 3A, and 4 for uplink and defined as formats 1, 1A, 1B, 1C, 1D, 2, 2A, 2B, 2C, and 2D for downlink. For example, DCI format may selectively include exemplary fields shown in Table 3. In Table 3, a bit size of each information field is a non-limiting example.

TABLE 3

| Field | Bit(s) |
|---|---|
| Flag for determining DCI format 0/1A | 1 |
| Hopping flag | 1 |
| RB assignment | $[\log_2(N_{RB}^{UL}(N_{RB}^{UL} + 1)/2)]$ |
| MCS (Modulation and coding scheme) and RV (Redundancy Version) | 5 |
| NDI (New Data Indicator) | 1 |
| TPC (Transmit Power Control) command for scheduled PUSCH | 2 |
| Cyclic shift for DM RS | 3 |
| UL index (TDD) | 2 |
| CQI request | 1 |

The flag field is an information field for identifying between DCI format 0 and DCI format 1A. That is, DCI format 0 and DCI format 1A have the same payload size and are identified by the flag field. The bit size of the resource block allocation and hopping resource allocation field may vary according to hopping PUSCH or non-hopping PUSCH. The resource block allocation and hopping resource allocation field for the non-hopping PUSCH provides $\lceil \log_2(N_{RB}^{UL}(N_{RB}^{UL}+1)/2) \rceil$ bits for resource allocation of the first slot in an uplink subframe. Here, $N_{RB}^{UL}$ denotes the number of RBs included in an uplink slot and depends upon an uplink transmission bandwidth set in a cell. Accordingly, the payload size of DCI format 0 may depend upon uplink bandwidth. DCI format 1A includes an information field for PDSCH allocation. The payload size of DCI format 1A may depend upon downlink bandwidth. DCI format 1A provides a reference information bit size for DCI format 0. Accordingly, DCI format 0 is padded with '0' until the payload size of DCI format 0 becomes identical to the payload size of DCI format 1A when the number of information bits of DCI format 0 is less than the number of information bits of DCI format 1A. The added '0' is filled in a padding field of DCI format.

The TPC field includes a power control command or value for PUSCH transmission, PUCCH transmission, or PRACH transmission at a UE. The TPC field is given by an absolute value or a relative value. The relative value may be accumulated to the current value of transmission power. When the current value of transmission power is the maximum transmission power of UE, a positive value of TPC may not be accumulated. When the current value of transmission power is the minimum transmission power of UE, a negative value of TPC may not be accumulated.

A base station determines a PDCCH format according to DCI to be transmitted to a UE, and attaches a cyclic redundancy check (CRC) to control information. The CRC is masked with an identifier (e.g. a radio network temporary identifier (RNTI)) according to an owner or usage of the PDCCH. For example, if the PDCCH is for a specific UE, an identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

A plurality of PDCCHs may be transmitted within one subframe. A UE may monitor the plurality of PDCCHs. PDCCH is transmitted on an aggregation of one or several consecutive control channel elements (CCEs). A CCE is a logical allocation unit used to provide the PDCCH with a coding rate based on a state of a radio channel. The CCE corresponds to a plurality of resource element groups (REGs).

The LTE(-A) system defines a limited set of CCE positions in which a PDCCH is to be positioned for each UE. The limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH.

Information contents of DCI formats are listed in the followings:
DCI Format
Format 0: Resource grant for PUSCH transmission (uplink)
Format 1: Resource allocation for single codeword PUSCH transmission (transmission modes 1, 2, and 7)
Format 1A: Compact signaling of resource allocation for single codeword PDSCH transmission (all modes)
Format 1A: Compact signaling of resource allocation for single crank-1 closed-loop precoding
Format 1C: Very compact resource allocation for PDSCH (e.g., paging/broadcast system information)
Format 1D: Compact resource allocation for PDSCH (mode 5) using multi-user MIMO
Format 1D: Compact resource allocation for PDSCH (mode 5) using multi-user MIMO
Format 1D: Compact resource allocation for PDSCH (mode 5) using multi-user MIM
Format 3/3A: Power control command with 2-bit/1-bit power adjustments for PUCCH and PUSCH
Format 3/3A: Power control command with 2-bit/1-bit power adjustments for PUCCH and multi-antenna port transmission mode When a packet is transmitted in a wireless communication system, signal distortion may occur during transmission since the signal is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is referred to as a pilot signal or a reference signal.

Reference signals may be classified into a reference signal for acquiring channel information and a reference signal used for data demodulation. The former is for a UE to acquire channel information in downlink, the reference signal for acquiring channel information is transmitted in wideband, and a UE which does not receive downlink data in a specific subframe receives the reference signal. Further, this reference signal is used in a handover situation. The latter is a reference signal transmitted together when a base station transmits a downlink signal, and enables a UE to demodulate the downlink signal using the reference signal. The reference signal used for data demodulation is required to be transmitted in a data transmission region. For example, downlink reference signal includes:

i) a cell-specific reference signal (CRS) shared by all UEs in a cell;

ii) a UE-specific reference signal for a specific UE only;

iii) a demodulation reference signal (DM-RS) transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Figure 6:
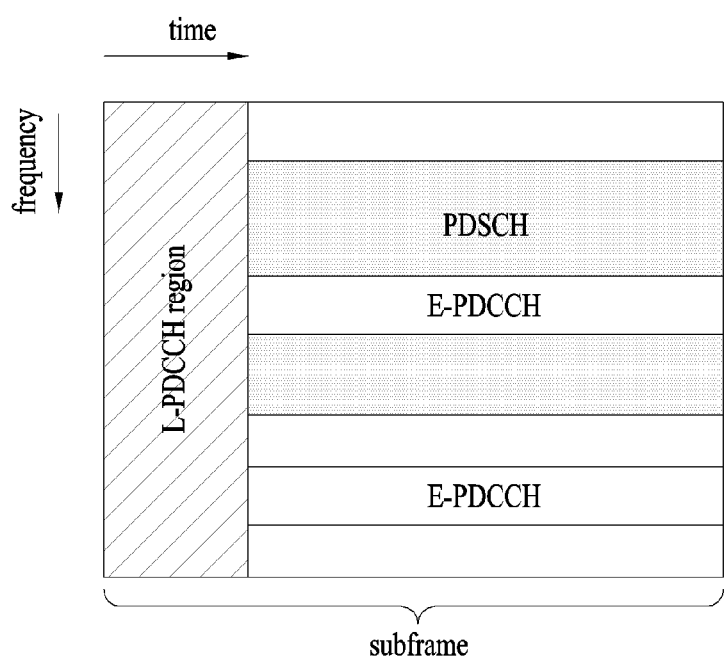
FIG. 6 illustrates an example of allocating E-PDCCH in a subframe.

FIG. 6 illustrates an example of allocating E-PDCCH in a subframe. As described above with reference to FIG. 4 and FIG. 5, first n number of OFDM symbols of a subframe are used to transmit PDCCH, PHICH, PCFICH and the like corresponding to physical channels configured to transmit various control information and the rest of OFDM symbols are used to transmit PDSCH in LTE (-A) system. A system (e.g., a system appearing after 3GPP TS 36 series release 11) appearing after LTE (-A) is introducing an enhanced PDCCH (E-PDCCH), which is multiplexed with PDSCH in a data region.

Referring to FIG. 6, a PDCCH (for convenience, legacy PDCCH or L-PDCCH) used in the LTE(-A) system may be allocated to a control region of a subframe. In the figure, an L-PDCCH region refers to a region to which the legacy PDCCH is allocated. In the context, the L-PDCCH region may refer to a control region, a control channel resource region (i.e., a CCE resource) to which a PDCCH can be actually allocated, or a PDCCH search space. A PDCCH may be additionally allocated in a data region (e.g., a resource region for a PDSCH, refer to FIG. 5). The PDCCH allocated to the data region is referred to as an E-PDCCH. As illustrated, a channel resource may be additionally ensured through the E-PDCCH to alleviate scheduling restrictions due to limited control channel resource of an L-PDCCH region.

In detail, the E-PDCCH may be detected/demodulated based on a DM-RS. The E-PDCCH may be configured to be transmitted over a PRB pair on a time axis. In more detail, a search space (SS) for E-PDCCH detection may be configured with one or more (e.g., 2) E-PDCCH candidate sets. When E-PDCCH based scheduling is configured, a subframe for transmission/detection of an E-PDCCH may be designated. The E-PDCCH may be configured in only a USS. The UE may attempt DCI detection only on an L-PDCCH CSS and an E-PDCCH USS in a subframe (hereinafter, an E-PDCCH subframe) in which E-PDCCH transmission/detection is configured and attempt DCI detection on an L-PDCCH CSS and an L-PDCCH USS in a subframe (non-E-PDCCH subframe) in which transmission/detection of E-PDCCH is not configured.

Like an L-PDCCH, an E-PDCCH carries DCI. For example, the E-PDCCH may carry DL scheduling information and UL scheduling information. An E-PDCCH/PDSCH procedure and an E-PDCCH/PUSCH procedure are the same/similar to in steps S207 and S208 of FIG. 2. That is, a UE may receive the E-PDCCH and receive data/control information through a PDSCH corresponding to the E-PDCCH. In addition, the UE may receive the E-PDCCH and transmit data/control information through a PUSCH corresponding to the E-PDCCH. The LTE(-A) system pre-reserves a PDCCH candidate region (hereinafter, a PDCCH search space) in a control region and transmits a PDCCH of a specific UE to a partial region of the PDCCH candidate region.

Figure 7:
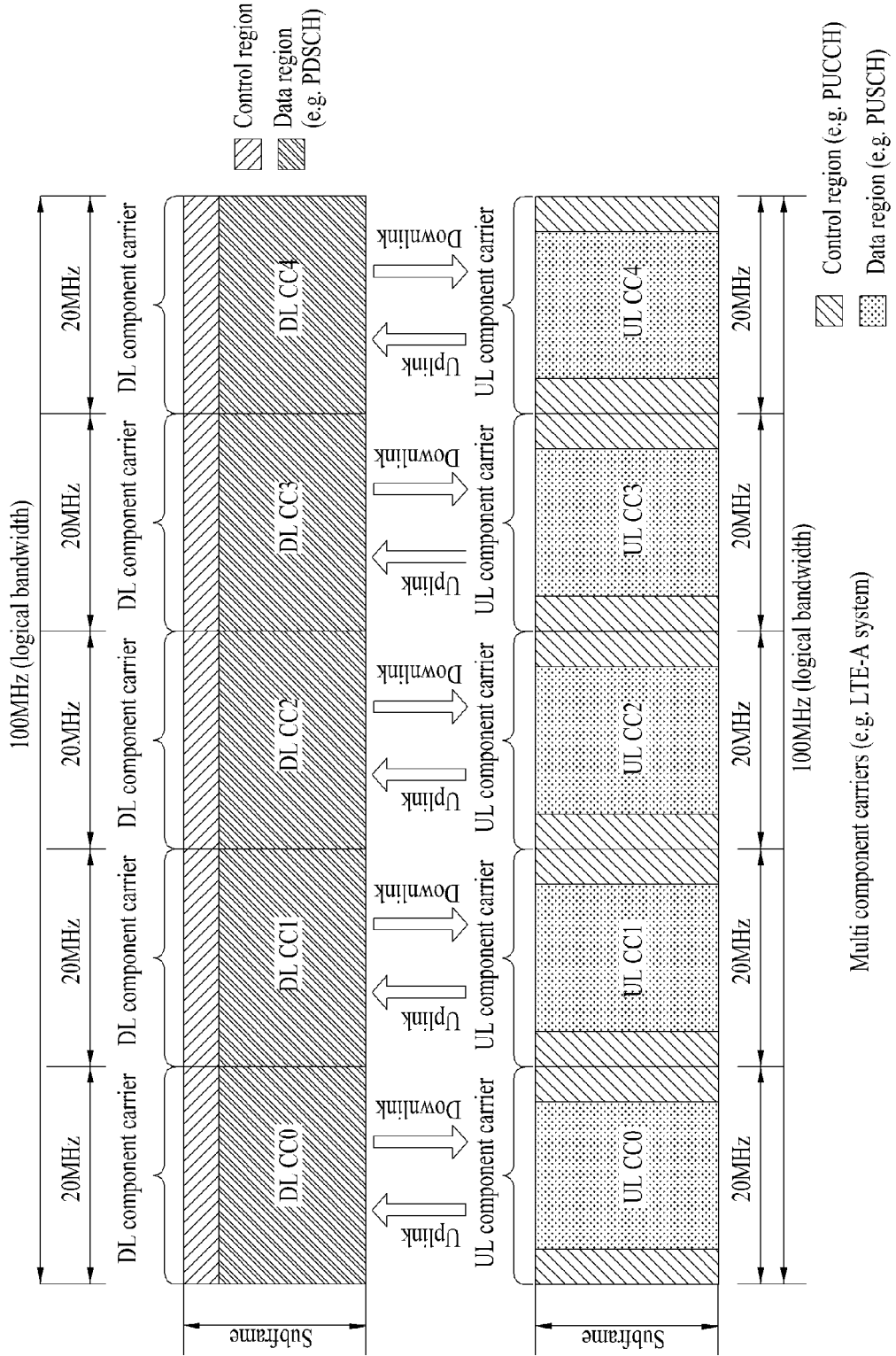
FIG. 7 illustrates an example of a carrier aggregation (CA) system.

FIG. 7 illustrates an example of a carrier aggregation (CA) system.

Referring to FIG. 7, a wider UL/DL bandwidth may be supported in a manner of collecting a plurality of UL/DL component carriers (CCs). A technology of collecting and using a plurality of the component carriers is referred to as a carrier aggregation or bandwidth aggregation. A component carrier can be comprehended as a carrier frequency (or center carrier, center frequency) for a corresponding frequency block. Each of a plurality of the component carriers may be adjacent or non-adjacent to each other in frequency domain. A bandwidth of each component carrier may be independently determined. It may configure an asymmetrical carrier aggregation of which the number of UL CCs is different from the number of DL CCs. For instance, there are 2 DL CCs and 1 UL CC, asymmetrical carrier aggregation can be configured in a manner that the DL CC corresponds to the UL CC by 2:1. A link between a DL CC and an UL CC is fixed in a system or may be semi-statically configured. Although a whole system band consists of N number of CCs, a frequency band capable of being monitored/received by a specific user equipment can be restricted to M (<N) number of CCs. Various parameters for carrier aggregation may be configured by a cell-specific, a UE group-specific or a UE-specific scheme.

Meanwhile, control information may be configured to be transmitted and received on a specific CC only. Such specific CC is referred to as a primary CC (PCC) and the rest of CCs are referred to a secondary CC (SCC). The PCC can be used for a user equipment to perform an initial connection establishment process or a connection re-establishment process. The PCC may correspond to a cell indicated in a handover process. The SCC can be configured after an RRC connection is established and can be used to provide an additional radio resource. As an example, scheduling information can be configured to be transceived via a specific CC only. This sort of scheduling scheme is called cross-carrier scheduling (or cross-CC scheduling). If the cross-CC scheduling is applied, PDCCH for DL assignment is transmitted on a DL CC #0 and corresponding PDSCH can be transmitted on a DL CC #2, The term "component carrier" may be replaced with a different equivalent terminology such as a carrier, a cell or the like. For example, PCC and SCC may be interchangeably used with PCell and SCell, respectively.

In the mean time, in a long term evolution-advanced (LTE-A) system, a multimedia broadcast multicast service single frequency network (MBSFN)-based multimedia broadcast and multimedia service (MBMS) is defined in order to provide a broadcast service over a communication network. An MBSFN is technology for simultaneously transmitting the same data at the same time in all of nodes belonging to an MBSFN area in synchronization with a radio resource. Here, the MBSFN area refers to an area covered by one MBSFN. According to the MBSFN, even when the UE is located at an edge of coverage of a node that the UE has accessed, a signal of a neighboring node functions not as interference but as gain. That is, the MBSFN introduces a single frequency network (SFN) function for MBMS transmission, thereby reducing service interference caused by frequency switching in the middle of MBMS transmission. Therefore, the UE within the MBSFN area recognizes MBMS data transmitted by multiple nodes as data transmitted by one node and in this MBSFN area, the UE may receive a seamless broadcast service without an additional handover procedure even while in motion. In the MBSFN, since a plurality of nodes use a single frequency in order to simultaneously perform synchronized transmission, frequency resources can be saved and spectrum efficiency can be raised.

Meanwhile, in a 3GPP LTE(-A) system (e.g., Release-8, 9, or 10), a CRS and a control channel such as a PCFICH/PDCCH/PHICH may be transmitted in every DL subframe of a carrier, except a DL subframe configured for a special purpose (e.g., as an MBSFN subframe). The CRS may be allocated across OFDM symbols of a subframe and the control channel such as a PCFICH/PDCCH/PHICH may be allocated to some starting OFDM symbols of a subframe in time. The CRS and the control channels may ensure backward compatibility for legacy UEs in terms of connection and service provisioning. However, it may be difficult to overcome inter-cell interference, improve carrier extension, and provide advanced features, while maintaining backward compatibility with the legacy LTE system. Accordingly, introduction of a new carrier, subframe, or TM structure that supports none or a part of the afore-described backward compatible signals/channels may be considered in order to provide various advanced features compared to the legacy LTE system, in a next-release system. A carrier type that is not compatible with the legacy LTE system may be referred to as a New Carrier Type (NCT), and a carrier compatible with the legacy LTE(-A) system may be referred to as a Legacy Carrier Type (LCT).

Figure 8:
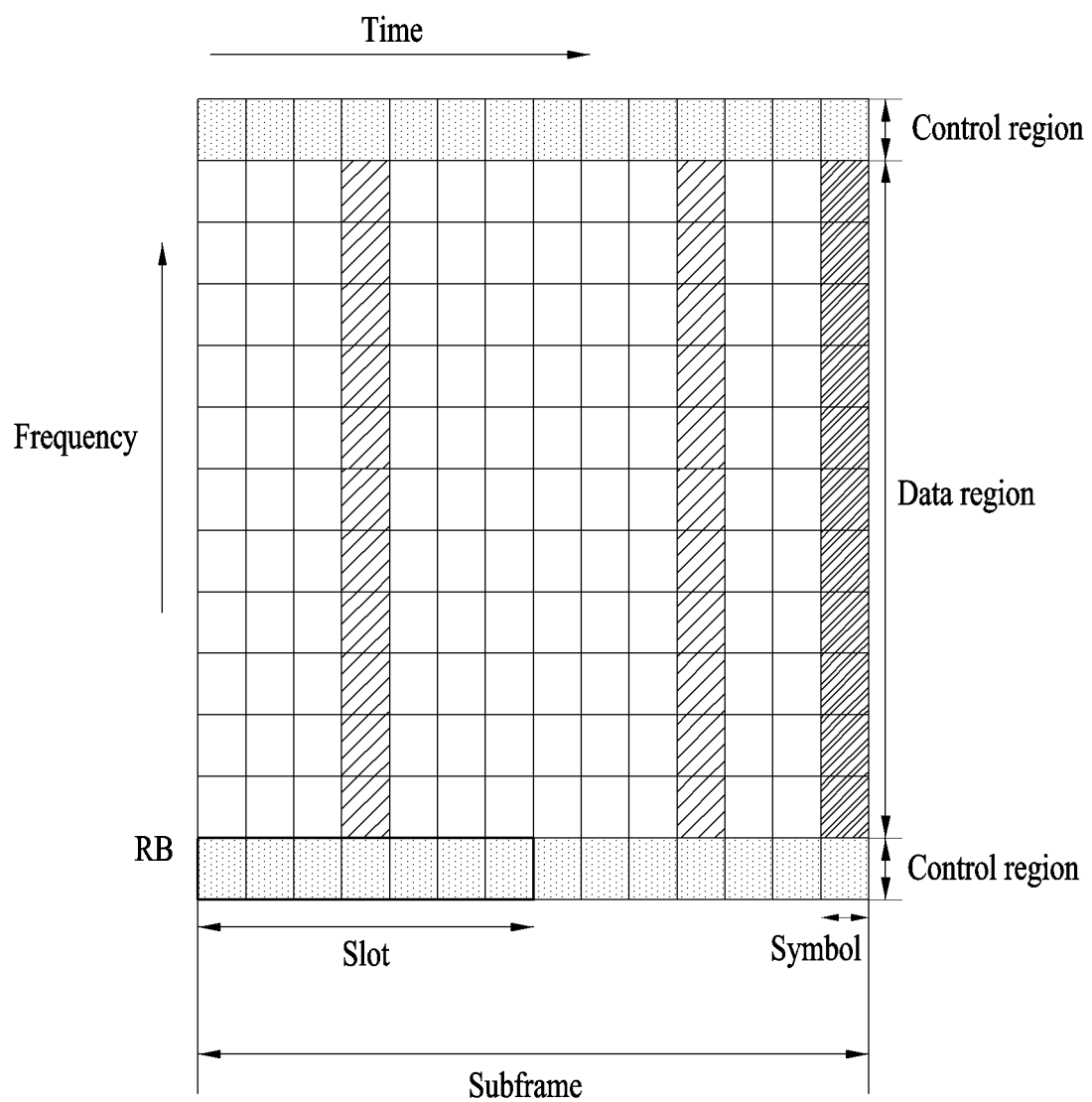
FIG. 8 illustrates a structure of an uplink subframe.

FIG. 8 illustrates a structure of an uplink subframe.

Referring to FIG. 8, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP, and a slot may comprise 6 SC-FDMA symbols in case of extended CP. An uplink subframe is divided into a data region and a control region. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis (e.g. RB pair located frequency mirrored positions), and performs hopping on the border of the slots. The uplink control information (UCI) includes HARQ ACK/NACK, CQI (Channel Quality Indicator), a precoding matrix indicator (PMI), a rank indicator (RI), etc.

SRS(Sounding Reference Signal) is transmitted at the last SC-FDMA symbol of a subframe. SRS may be transmitted periodically, or may be transmitted aperiodically according to a request of a base station. Periodic SRS transmission is defined by a cell-specific parameter and a UE-specific parameter. The cell-specific parameter notifies an entire subframe set (hereinafter, cell-specific SRS subframe set) available for SRS transmission within a cell, and the UE-specific parameter notifies a subframe sub-set (hereinafter, UE-specific SRS subframe set) actually allocated to a UE within the entire subframe set.

The PUCCH can be used to transmit the following control information.

SR (scheduling request): This is information used to request UL-SCH resources and is transmitted using on-off keying (OOK) scheme.

HARQ-ACK: This is a response signal to a downlink signal (e.g., PDSCH, SPS release PDCCH). For example, 1-bit ACK/NACK is transmitted as a response to one DL codeword and 2-bit ACK/NACK is transmitted as a response to two DL codewords.

CSI (Channel Status Information): This is feedback information on a DL channel and includes channel quality information (CQI), rank indicator (RI), precoding matrix indicator (PMI), precoding type indicator (PTI), etc. Here, the CSI refers to periodic CSI (p-CSI). Aperiodic CSI (aperiodic CSI (a-CSI)) transmitted at the request of an eNB is transmitted on a PUSCH.

Table 4 shows the mapping relationship between a PUCCH format (PF) and UCI in LTE(-A).

TABLE 4

| PUCCH format | Uplink Control Information, UCI |
| --- | --- |
| Format 1 | SR(Scheduling Request) (un-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |
| Format 2 | CSI and 1/2-bit HARQ ACK/NACK (20 bits) (Extended CP only) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3(LTE-A) | HARQ ACK/NACK + SR (48 bits) |

Figure 9:
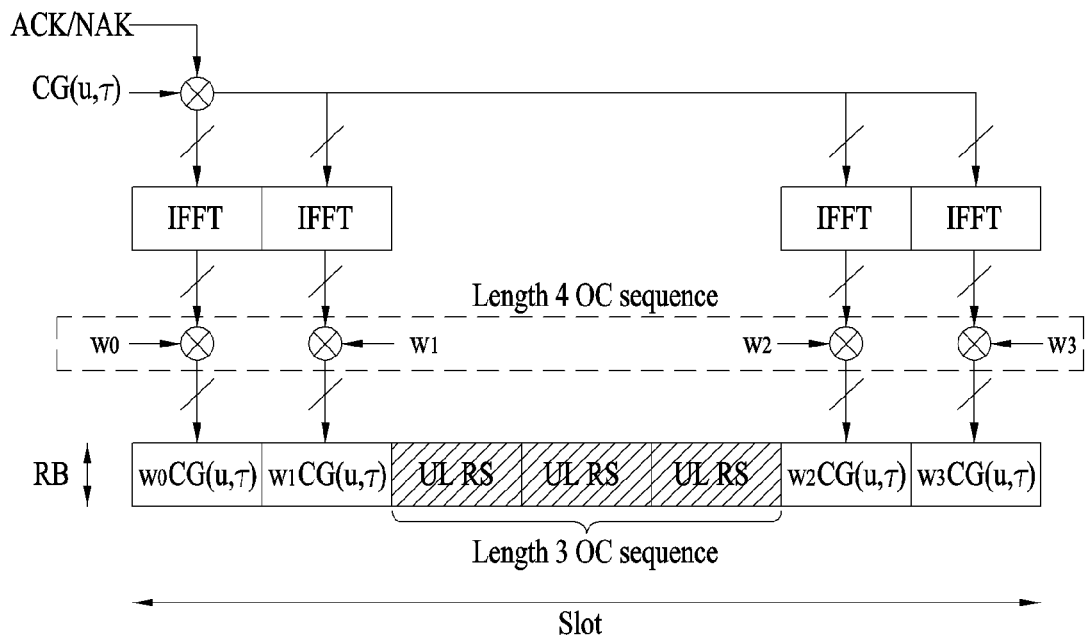
FIG. 9 illustrates structures of PUCCH formats 1a and 1b in a slot level.

FIG. 9 illustrates structures of PUCCH formats 1a and 1b in a slot level. In PUCCH formats 1a and 1b, the same control information is repeated on a slot basis in a subframe. Each UE transmits an ACK/NACK signal in different resources configured by a different cyclic shift (CS) (frequency-domain code) and a different orthogonal cover code (OCC) (time-domain spreading code) of a computer-generated constant amplitude zero auto correlation (CG-CAZAC) sequence. An OCC includes a Walsh/DFT orthogonal code. If the number of CSs is 6 and the number of OCs is 3, ACK/NACK signals of 18 UEs may be multiplexed into the same physical resource block (PRB). In PUCCH format 1, ACK/NACK in PUCCH format 1a/1 is replaced by an SR.

Figure 10:
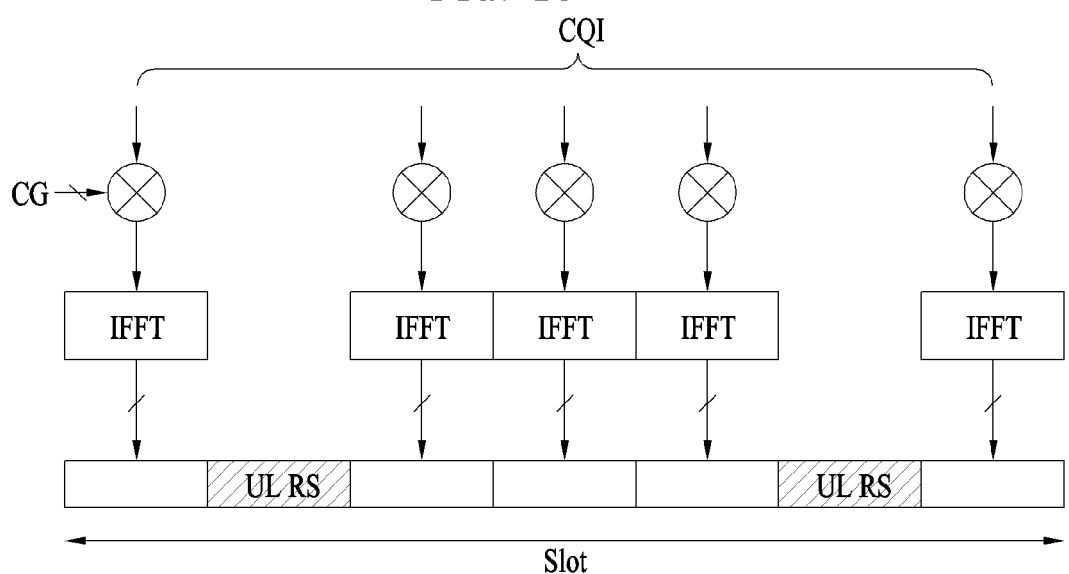
FIG. 10 illustrates a structure of PUCCH format 2.

FIG. 10 illustrates a structure of PUCCH format 2.

Referring to FIG. 10, if a normal CP is configured, PUCCH format 2/2a/2b includes five QPSK data symbols and two RS symbols at a slot level. If an extended CP is configured, PUCCH format 2/2a/2b includes five QPSK data symbols and one RS symbol at a slot level. If an extended CP is configured, an RS symbol is located at a fourth SC-FDMA symbol of each slot. Accordingly, PUCCH format 2/2a/2b may carry a total of 10 QPSK data symbols. Each QPSK symbol is spread in the frequency domain by a CS and then is mapped to an SC-FDMA symbol. The RS may be multiplexed by code division multiplexing (CDM) using a CS. It may be necessary to transmit A/N and CSI in the same subframe. In this case, when a higher layer sets non-permission of simultaneous transmission of A/N and CSI ("Simultaneous-A/N-and-CQI" parameter=OFF), only A/N transmission is performed using PUCCH format 1a/1b and CSI transmission is dropped. Conversely, when permission of simultaneous transmission of A/N and CSI is set ("Simultaneous-AN-and-CQI" parameter=ON), A/N and CSI are transmitted together through PUCCH format 2/2a/2b. Specifically, in a normal CP case, A/N is embedded in the second RS of each slot (e.g., A/N is multiplied by the RS) in PUCCH format 2a/2b. In an extended CP case, A/N and CSI are joint-coded and then transmitted through PUCCH format 2.

Figure 11:
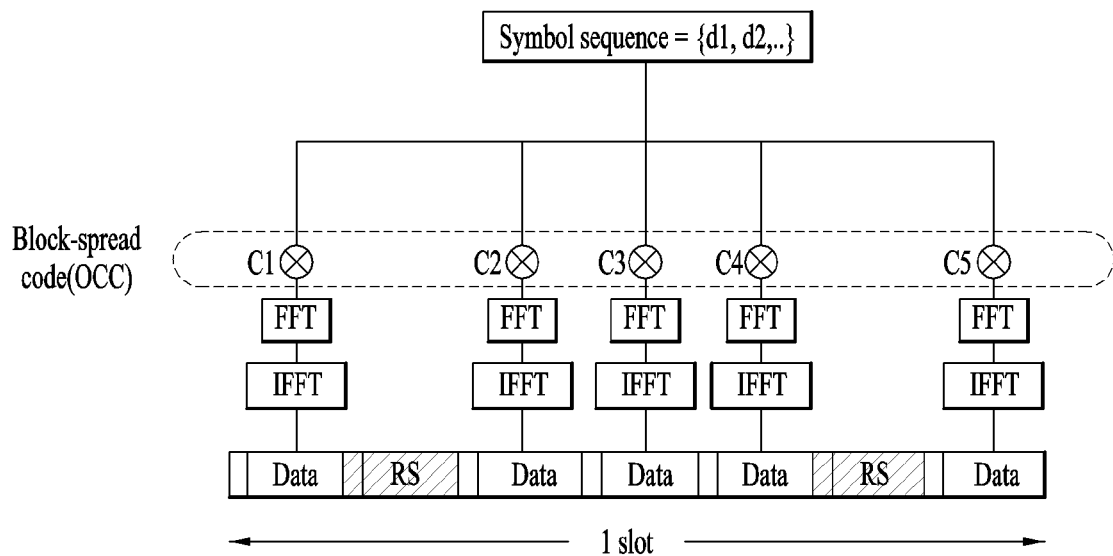
FIG. 11 illustrates a structure of PUCCH format 3 in a slot level.

FIG. 11 illustrates a structure of PUCCH format 3 in a slot level. PUCCH format 3 is used to transmit a plurality of ACK/NACK information, and information such as CSI and/or SR may be transmitted together.

Referring to FIG. 11, one symbol sequence is transmitted over the frequency domain, and OCC-based time-domain spreading is applied to the symbol sequence. Control signals of a plurality of UEs may be multiplexed into the same RB using OCCs. Specifically, 5 SC-FDMA symbols (i.e. a UCI data part) are generated from one symbol sequence {d1, d2, if using a length-5 OCC. Here, the symbol sequence {d1, d2, may be a modulation symbol sequence or a codeword bit sequence. The symbol sequence {d1, d2, sy may be generated by performing joint coding (e.g., Reed-Muller coding, tail-biting convolutional coding, etc.), block-spreading, and SC-FDMA modulation on a plurality of ACK/NACK information.

Figure 12:
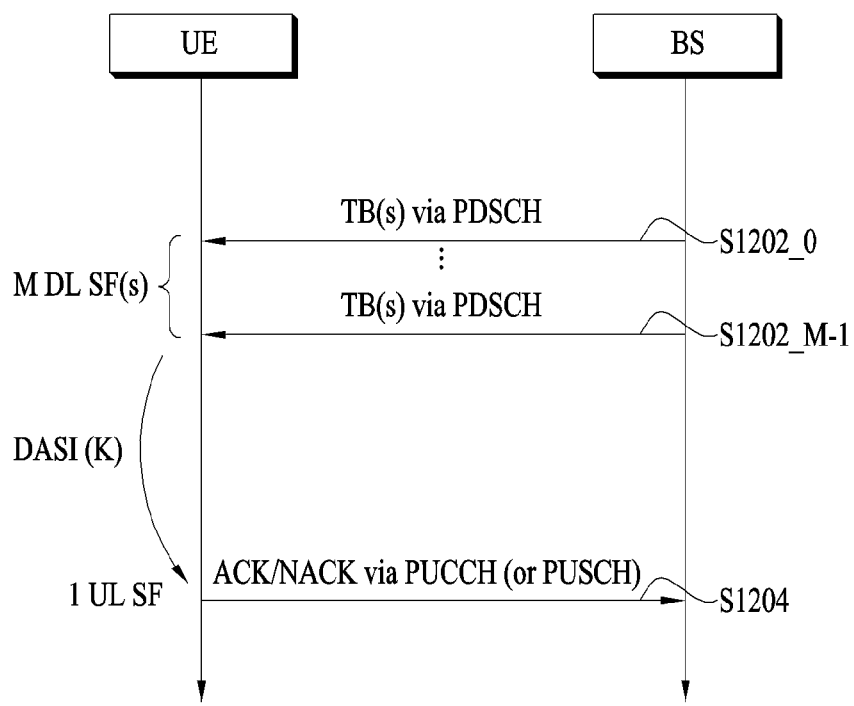
FIGS. 12 and 13 illustrate ACK/NACK (A/N) timing (or HARQ timing).
Figure 13:
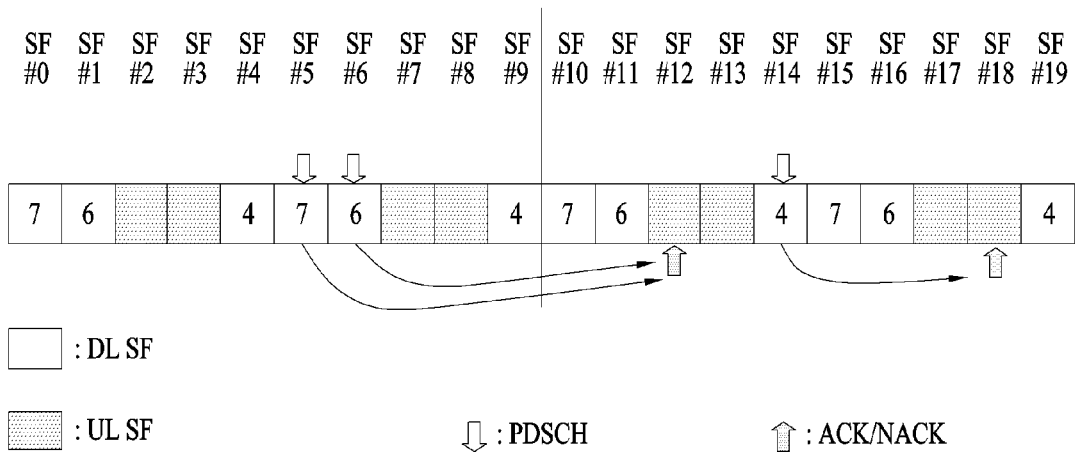

FIGS. 12 and 13 illustrate ACK/NACK (A/N) timing (or HARQ timing).

Referring to FIG. 12, a UE may receive one or more PDSCH signals in M DL subframes (SFs) (S1202_0 to S1202_M−1) (M receive one or more PDSCH signals in M DL subframes (SFs) (S-based time-domain sprearding to a transmission mode. Although not shown in FIG. 10, a PDCCH signal indicating SPS release may also be received in steps S1202_0 to S1202_M−1. When a PDSCH signal and/or SPS release PDCCH signal are present in the M DL subframes, the UE transmits an ACK/NACK in one UL subframe corresponding to the M DL subframes through a procedure for ACK/NACK transmission (e.g. ACK/NACK (payload) generation, ACK/NACK resource allocation, etc.) (S1204). The ACK/NACK includes acknowledgement information on the PDSCH signal and/or SPS release PDCCH signal of steps S1202_0 to S1202_M−1. Although the ACK/NACK is basically transmitted on a PUCCH, if there is PUSCH transmission at ACK/NACK transmission timing, the ACK/NACK is transmitted on a PUSCH. If a plurality of CCs are configured for the UE, the PUCCH is transmitted only in a PCC, and the PUSCH is transmitted in a scheduled CC. A variety of PUCCH formats shown in Table 2 may be used for ACK/NACK transmission. Furthermore, a variety of schemes such as ACK/NACK bundling, ACK/NACK channel selection (CHSel), etc. may be used to reduce the number of ACK/NACK bits to be transmitted.

M=1 in FDD and M is an integer equal to or greater than 1 in TDD. In TDD, the relationship between M DL subframes and UL subframes in which A/N transmitted is determined by a DASI (Downlink Association Set Index).

Table 5 shows a DASI (K:{$k_0, k_1, \ldots k_{M-1}$}) defined in LTE(-A). When a PDCCH that indicates PDSCH transmission and/or SPS (Semi-Persistent Scheduling) release is present in subframe n–k (k∈K), a UE transmits ACK/NACK in subframe n. In FDD, DASI (for convenience, $d_F$)=4.

TABLE 5

| UL-DL Config-uration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD operation, a UE needs to transmit one or more A/N signals for DL transmission (e.g., PDSCH), received through M DL SFs, through one UL SF. Methods for transmitting A/N for a plurality of DL SFs through one UL SF are will now be described.

1) A/N bundling: A/N bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection (CHsel): A UE receiving a plurality of data units (e.g. PDSCH, SPS release PDCCH, etc.) occupy a plurality of PUCCH resources for A/N transmission. A/N responses to the plurality of data units are identified by combinations of PUCCH resources used for A/N transmission and transmitted A/N (e.g. bit values and QPSK symbol values). Channel selection is also referred to as A/N selection and PUCCH selection.

A description will be given of a method for determining an ACK/NACK transmission resource in the case of L-PDCCH based scheduling. When PUCCH format 1a/1b (referred to as PF1 hereinafter) is set for A/N transmission, an ACK/NACK transmission resource scheduled by a DL grant L-PDCCH can be determined as a PUCCH resource linked to a specific ECCE index (e.g., minimum ECCE index) corresponding to an ECCE constituting the DL grant L-PDCCH (implicit PUCCH resource). Specifically, in LTE/LTE-A, a PF1 resource index is determined as follows.

$$n_{PUCCH}^{(1)} = n_{CCE} + N_{PUCCH}^{(1)} \quad \text{[Equation 1]}$$

Here, $n^{(1)}_{PUCCH}$ indicates a resource index of PF1 for ACK/NACK/DTX (Discontinuous Transmission) transmission, $N^{(1)}_{PUCCH}$ indicates a signaling value received from a higher layer (e.g., Radio Resource Control (RRC)), and $n_{CCE}$ indicates a smallest value from among CCE indices used for L-PDCCH transmission. A CS (Cyclic Shift), an OC (Orthogonal Code) and a PRB (Physical Resource Block) for PF1 are obtained from $n^{(1)}_{PUCCH}$.

When PUCCH format 3 (briefly, PF3) is set for A/N transmission, a specific PF3 resource index from among a plurality of PF3 resource indices ($n^{(3)}_{PUCCH}$) allocated by a higher layer (e.g., RRC) can be indicated by an ARI (ACK/NACK Resource Indicator) of the DL grant L-PDCCH (explicit PUCCH resource). The ARI is transmitted through a TPC field of an L-PDCCH that schedules a PDSCH of an SCell. An OC and a PRB for PF3 are obtained from $n^{(3)}_{PUCCH}$.

Even in the case of EPDCCH based scheduling, an ACK/NACK transmission resource for DL data scheduled by a DL grant EPDCCH can be determined as a PUCCH resource linked to a specific ECCE index (e.g., minimum ECCE index) corresponding to an ECCE constituting the DL grant EPDCCH or an ECCE index obtained by adding a specific offset value to the specific ECCE index. An ACK/NACK feedback transmission resource can be determined as a PUCCH resource linked to a specific ECCE index (e.g., minimum ECCE index) corresponding to an ECCE constituting the DL grant EPDCCH or an ECCE index obtained by adding a specific offset value to the specific ECCE index. Here, the specific offset value can be determined by a value, which is directly signaled through an ARO (ACK/NACK Resource Offset) field in the DL grant EPDCCH, and/or a value designated per AP (Antenna Port). Specifically, information signaled through the TPC field and the ARO field in the DL grant EPDCCH according to frame structure type (e.g., FDD or TDD) and feedback transmission method (e.g., PF3 or CHsel) can be configured as follows. For convenience, a TPC command for PUCCH power control is defined as "TPC value", an offset value added when an implicit PUCCH index is determined is defined as "ARO value", and an ARI that indicates a specific one of a plurality of PF3 indices or a plurality of PF1 indices (groups) allocated through RRC is defined as "ARI value". In addition, a fixed value (e.g., "0") that is inserted (for virtual CRC or the like) without containing no information is defined as "fixed value".

Table 6 shows an example of ARI values. For example, an ARI value may be indicated using a TPC (Transmit Power Control) field of SCell PDCCH and/or one or more PCell PDCCHs not corresponding to the DAI initial value.

TABLE 6

| HARG-ACK resource indicator (ARI) for PUCCH | $n_{PUCCH}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

Table 7 shows an example of relationship between HARQ-ACKs and transport blocks of serving cells in 2-bit or 4-bit ACK/NACK channel selection scheme.

TABLE 7

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 Primary cell | TB2 Secondary cell | NA | NA |
| 3 | TB1 Serving cell1 | TB2 Serving cell1 | TB3 Serving cell2 | NA |
| 4 | TB1 Primary cell | TB2 Primary cell | TB3 Secondary cell | TB4 Secondary cell |

Table 8 shows an example of mapping table for 2-bit A/N channel selection. It is assumed that 2 serving cells are aggregared for 2-bit A/N channel selection. PUCCH resource 0 may be implicitly signaled. For example, PUCCH resource 0 may be linked to a CCE (e.g., lowest CCE index) constructing DL grant PDCCH corresponding to PCell PDSCH. PUCCH resource 1 may be linked to a CCE (e.g., lowest CCE index) constructing DL grant PDCCH corresponding to SCell PDSCH (e.g. in case of cross-CC scheduling), or may be signaled explicitly by RRC (e.g. in case of non-cross-CC scheduling).

TABLE 8

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

In Table 8, $n^{(1)}_{PUCCH,i}$ represents PUCCH resource index corresponding to PUCCH resource i. b(0)b(1) represents bit values corresponding to complex modulation values.

Table 9 shows an example of mapping table for 3-bit A/N channel selection. 3-bit A/N channel selection may be used for a case that 2 serving cells or 3 serving cells are aggregated.

TABLE 9

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

In Table 9, $n^{(1)}_{PUCCH,i}$ represents PUCCH resource index corresponding to PUCCH resource i. b(0)b(1) represents bit values corresponding to complex modulation values.

Table 10 shows an example of mapping table for 4-bit A/N channel selection. 4-bit A/N channel selection may be used for a case that 2 to 4 serving cells are aggregated.

TABLE 10

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |

TABLE 10-continued

| HARQ-ACK(0), HARQ-ACK(1), HARQ-ACK(2), HARQ-ACK(3) | $n_{PUCCH}^{(1)}$ | b(0)b(1) |
|---|---|---|
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

In Table 10, $n^{(1)}_{PUCCH,i}$ represents PUCCH resource index corresponding to PUCCH resource i. b(0)b(1) represents bit values corresponding to complex modulation values. Referring to Table 10, UE receives one or more PDSCHs from a base station, and then generates HARQ-ACK(0)(1)(2)(3) corresponding to the received PDSCHs. UE selects PUCCH resource (e.g. $n^{(1)}_{PUCCH}$) corresponding to HARQ-ACK(0)(1)(2)(3), and transmits a corresponding bit value (or modulation value) to the base station through the selected PUCCH resource.

FIG. 13 illustrates A/N timing applied to a CC having UL-DL Cfg #1. In FIG. 11, SF#0 to SF#9, and SF#10 to SF#19 correspond to radio frames. The numeral in a box denotes a DL subframe associated with a UL subframe. For example, an ACK/NACK of a PDSCH of SF#5 is transmitted in SF#5+7 (=SF#12), and an ACK/NACK of a PDSCH of SF#6 is transmitted in SF#6+6 (=SF#12). That is, an ACK/NACK of SF#5/SF#6 is transmitted in SF#12. Likewise, an ACK/NACK of a PDSCH of SF#14 is transmitted in SF#14+4 (=SF#18).

In a TDD CC (or cell), when a UE transmits an ACK/NACK signal to a BS, if the UE has missed a part of PDCCH(s) transmitted from the BS in a period of a plurality of subframes, the UE does not even know that a PDSCH corresponding to the missed PDCCH was transmitted to the UE and thus an error may occur in generating ACK/NACK.

To solve this problem, a DL grant PDCCH/SPS release PDCCH for a TDD CC includes a DAI (Downlink Association Index) field (i.e., DL DAI field). The value of DL DAI field designates an cumulative value (i.e., count) of PDCCH(s) corresponding to PDSCH(s) and PDCCH(s) indicating downlink SPS release to a current subframe within DL subframe(s) n−k (k∈K). For example, if 3 DL subframes correspond to one UL subframe, PDSCHs transmitted in a period of 3 DL subframes are sequentially indexed (i.e., sequentially counted) and the index (or count) is delivered on a PDCCH for scheduling the PDSCHs. The UE may determine whether a previous PDCCH is appropriately received, by checking DAI information of the PDCCH.

Figure 14:
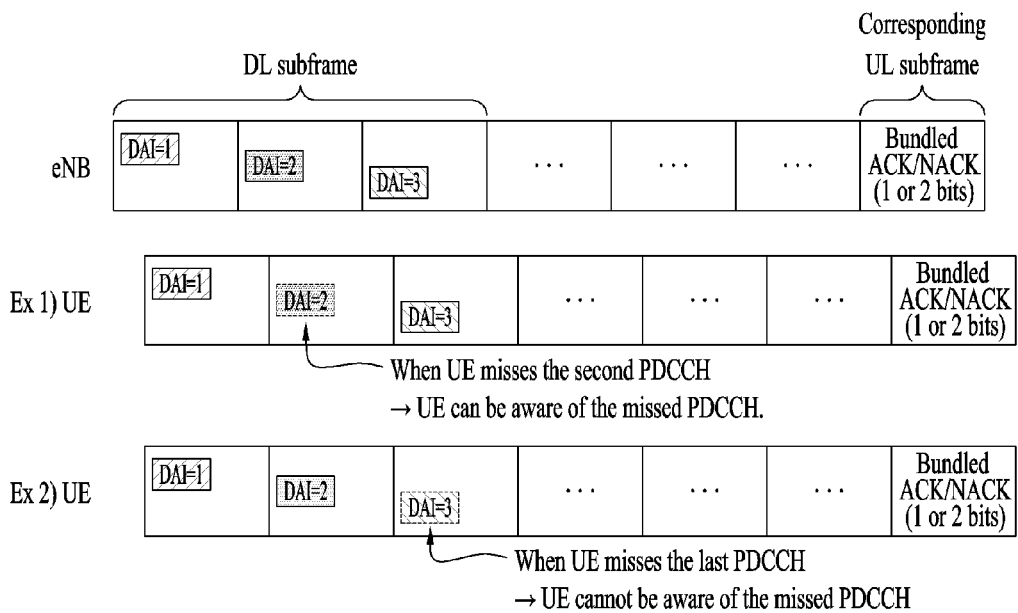
FIG. 14 illustrates an ACK/NACK transmission using a DL DAI.

FIG. 14 illustrates an ACK/NACK transmission using a DL DAI, This example assumes a TDD system configured by 3 DL subframes:1 UL subframe. It is assumed for convenience that a UE transmits ACK/NACK using PUSCH resources. In LTE, when ACK/NACK is transmitted on a PUSCH, 1-bit or 2-bit bundled ACK/NACK is transmitted.

Referring to FIG. 14, if the second PDCCH is missed as shown in Example 1, since a DL DAI value of the third PDCCH is different from a currently detected number of PDCCHs, the UE may know that the second PDCCH is missed. In this case, the UE may process an ACK/NACK response to the second PDCCH as a NACK (or NACK/DTX). On the other hand, if the last PDCCH is missed as shown in Example 2, since the last detected DAI value of a PDCCH is equal to a currently detected number of PDCCHs, the UE may not recognize that the last PDCCH is missed (i.e., DTX). Accordingly, the UE recognizes that only two PDCCHs are scheduled for a DL subframe period. In this case, the UE bundles ACK/NACK corresponding to first two PDCCHs and thus an error occurs in an ACK/NACK feedback procedure. To solve this problem, a UL grant PDCCH also includes a DAI field (i.e., UL DAI field). The UL DAI field is a 2-bit field and includes information about the number of scheduled PDCCHs.

Table 11 shows values ($V^{DL}_{DAI}$, $V^{UL}_{DAI}$) indicated by a DAI field in a DCI format. $V^{DL}_{DAI}$ denotes a DL DAI value, and $V^{UL}_{DAI}$ denotes a UL DAI value. $V^{DL}_{DAI}$ denotes the value of DAI field in DCI format 1/1A/1B/1D/2/2A/2B/2C/2D for UL-DL Cfgs #0 to #6. $V^{UL}_{DAI}$ denotes the value of DAI field in DCI format 0/4 (i) if one CC (or cell) having UL-DL Cfgs #1 to #6 is configured, or (ii) if a UE is configured not to use PUCCH format 3.

TABLE 11

| DAI MSB, LSB | $V_{DAI}^{DL}$ or $V_{DAI}^{UL}$ | Number of subframes with PDSCH transmission and with PDCCH indicating DL SPS release |
|---|---|---|
| 0,0 | 1 | 1 or 5 or 9 |
| 0,1 | 2 | 2 or 6 |
| 1,0 | 3 | 3 or 7 |
| 1,1 | 4 | 0 or 4 or 8 |

MSB: Most significant bit. LSB: Least significant bit.

DAI is used in various ways in an ACK/NACK transmission procedure. For example, a DAI may be used for DTX detection as illustrated in FIG. 14, or used in an ACK/NACK payload generating procedure (e.g., determination of the size of ACK/NACK payload and the location of ACK/NACK information in the ACK/NACK payload) or ACK/NACK resource allocation procedure.

A legacy LTE (Rel-8/9) and LTE-A (Rel-10/11) system may schedule only one DL/UL data from one DL/UL grant downlink control information (DCI) and employs a scheme of transmitting corresponding DL/UL data through one DL/UL subframe (i.e., a SF). In this specification, this scheduling method may be referred to as a single-SF scheduling. A future system may consider a multi-SF scheduling method for simultaneously scheduling a plurality of DL/UL data from one DL/UL grant DCI in order to enhance spectral efficiency, and in the multi-SF scheduling method, the plurality of corresponding DL/UL data may be configured to be sequentially transmitted through a plurality of DL/UL SFs.

The present invention proposes a feedback constructing/transmitting method for multi-SF scheduling. In detail, the present invention proposes a method for constructing a feedback and allocating a resource in relation to ACK (Acknowledgement)/NACK(Negative ACK) for multi-SF scheduling according to a radio frame type (e.g., FDD or TDD). In the present specification, ACK/NACK may be referred to as A/N, for convenience. First, for convenience of description of the present invention, terms used in the specification are defined as follows.

multi-SF window: K (e.g., K>1) subframes (SFs) directed to multi-SF scheduling multi-SF DCI: DCI scheduling a multi-SF window starting SF: a subframe (SF) in which multi-SF DCI is detected/received (or a specific SF after multi-SF DCI is detected/received)

indicated O-SF: a specific subframe (SF) that is directly indicated from multi-SF DCI (as a target to which scheduling is not applied)

A multi-SF window may include K consecutive subframes (SFs) including a starting SF. In this case, the K consecutive subframes may have one SF interval or one or more H (e.g., H>1) SF interval. For example, when two consecutive subframes include SF #n and SF #n+1, it may be said that the two consecutive subframes have one subframe (SF) interval. As another example, when two consecutive subframes include SF #n and SF #n+2, it may be said that the two consecutive subframes have a two SF interval.

In this case, the multi-SF window may include K consecutive SFs (or the remaining K or less SFs except for an indicated O-SF there among) except for SFs (all or some SFs) having the following special purpose or specific aspect from a starting SF, and such a scheme may be referred to as "SF-skipping". Alternatively, the multi-SF window may include only the remaining K or less SFs except for SFs (all or some SFs) having the following special purpose or specific aspect and/or an indicated O-SF among K consecutive SFs from a starting SF, and such a scheme may be referred to as "SF-omitting". For example, a SF having the following special purpose or specific aspect may refer to a SF corresponding to at least one of ① to ⑩ and may be referred to as "special X-SF" in this specification.

① SF configured for a multicast-broadcast single-frequency network (MBSFN) and/or SF configured to detect/receive a physical multicast channel (PMCH). The PMCH refers to a physical channel for carrying a multicast data signal.

② SF in which a physical broadcast channel (PBCH) and/or (specific) system information block (SIB) and/or a paging signal are transmitted. In detail, the SF may correspond to the special X-SF only when a resource region allocated through multi-SF DCI is overlapped with a resource (e.g., a resource block (RB)) occupied by a PBCH and/or a (specific) SIB and/or a paging signal. The PBCH refers to a physical channel for carrying a broadcast data signal.

③ SF in which a synchronization signal such as a primary synchronization signal (PSS) and/or a secondary synchronization signal (SSS) is transmitted. In detail, the SF may correspond to the special X-SF only when a resource region allocated through multi-SF DCI is overlapped with a resource (e.g., a resource block (RB)) occupied by a synchronization signal such as a PSS and/or a SSS. The PSS may be transmitted through a P-SCH and the SSS may be transmitted through the S-SCH.

④ SF in which transmitted PDSCH/PUSCH scheduling without corresponding PDCCH/EPDCCH is performed (or reserved). For example, SF in which data transmission and reception is performed based on scheduling based on semi-persistent scheduling (SPS)

⑤ SF that performs (or is configured to be available for) MACH transmission

⑥ SF that performs (or is configured to perform) positioning reference signal (PRS) transmission ⑦ All or specific TDD special SF (a downlink period (e.g., DwPTS) of which is configured with L or less symbols and/or in which DMRS is not transmitted). For example, L may be 3.

⑧ SF that perform (or is configured to perform) transmission of a common RS for synchronization tracking and/or a discovery signal for cell/UE in a new carrier type (in which CRSs are not consecutively transmitted). In detail, the SF may correspond to only the case in which a resource region allocated through multi-SF DCI is overlapped with a resource (e.g., a resource block (RB)) occupied by a common RS for tracking and/or a discovery signal.

⑨ SF that does not transmit (or is configured not to transmit) DMRS

⑩ SF that performs (or is configured to perform) transmission of non-zero power and/or zero-power CSI-RS A legacy single-SF scheduling method may be applied to an entire or specific partial portion of a special X-SF or an indicated O-SF.

When an interval between an SF in which multi-SF DCI is detected/received and a corresponding starting SF is S, K (and/or H) and/or S may be pre-set through high layer signaling (e.g., RRC signaling) and so on (e.g., K>1, H≥1, S≥0). In addition, whether a multi-SF window configured with K SFs is scheduled or one subframe (SF) is scheduled as a target of scheduling of the corresponding DCI may be signaled through the multi-SF DCI.

FIG. 15 illustrates a multi-SF scheduling method according to the present invention. FIG. 15(A) illustrates a multi-SF scheduling method according to a SF-skipping method, and FIG. 15(B) illustrates a multi-SF scheduling method according to a SF-omitting method.

Referring to FIGS. 15(A), K, H, and S may be pre-configured through high layer signaling (e.g., RRC signaling) and so on. Multi-SF DCI may be detected/received in a subframe SF #n and may include information indicating that a multi-SF window comprising K SFs is scheduled. In this case, the multi-SF window may start from a SF #(n+S) and may have an interval H. In the example of FIG. 15(A), a $m^{th}$ subframe SF #(n+S+(m−1)*H) in the multi-SF window may correspond to a special-X SF and/or an indicated-O SF. In this case, according to the SF-skipping method, the multi-SF window may include K subframes except for subframes corresponding to the special-X SF and/or the indicated-O SF. Accordingly, in the example of FIG. 15(A), the multi-SF window may include subframes from SF #(n+S) to SF #(n+S+K*H) with an interval H except for SF #(n+S+(m−1)*H).

On the other hand, referring to FIG. 15(B), the multi-SF window may include K subframes including a $m^{th}$ subframe SF #(n+S+(m−1)*H) in the multi-SF window. Accordingly, according to the SF-omitting method, the multi-SF window may include subframes from SF #(n+S) to SF #(n+S+(K−1)*H) with an interval H including SF #(n+S+(m−1)*H).

Hereinafter, the present invention proposes an A/N transmitting method for A/N feedback configuration corresponding to a plurality of data signals received through a multi-SF window. In the present invention, a multi-SF window directed to A/N feedback may be configured in the same or different way from a multi-SF window directed to multi-SF scheduling.

When a multi-SF window to which multi-SF scheduling is applied is configured based on an SF-skipping method, the multi-SF window directed to A/N feedback may be determined using one of the following methods.

A-1) Like the multi-SF window directed to multi-SF scheduling, the multi-SF window directed to A/N feedback may be configured with K consecutive SFs except for the special X-SF from a starting SF, and a legacy A/N feedback configuration/transmission method corresponding to a single SF may be applied to the excluded special X-SF. In addition, an indicated O-SF may also be excluded from the multi-SF window directed to A/N feedback, and a legacy A/N feedback/transmission method corresponding to a single SF may be applied to the indicated O-SF.

A-2) The multi-SF window directed to A/N feedback may be configured with K or more consecutive SFs from a starting SF to the special X-SF excluded from the multi-SF window directed to the multi-SF scheduling. In this case, the indicated O-SF may also be included in the multi-SF window directed to A/N feedback. In this case, an A/N response corresponding to the indicated O-SF (and/or the omitted special X-SF) may be determined according to a legacy A/N feedback method corresponding to a single SF. For example, when there is no detection/reception of separate single-SF DCI for scheduling a corresponding SF or a data signal scheduled by single subframe DCI is not received, an A/N response corresponding to the indicated O-SF (and/or the omitted special X-SF) may be processed as DTX or NACK.

In the case of the above method A-1 or A-2, A/N transmission timing may be determined as a UL subframe corresponding to a last SF (or a last SF in which a data signal is transmitted in the multi-SF window directed to A/N feedback) included in the multi-SF window directed to A/N feedback. For example, when a last SF of a multi-SF window corresponds to an indicated O-SF or a special X-SF, the last SF of the multi-SF window directed to A/N feedback may be a second last SF of the multi-SF window.

FIG. 16 illustrates an A/N feedback transmitting method according to the present invention. FIG. 16 assumes, but is not limited to, an example in which K=4 and a starting SF is SF #1. In addition, assuming that a DMRS is not transmitted in SF #3, SF #3 may be a special X-SF. In addition, it is assumed that a UL SF corresponding to SF #3 is SF #n and a UL SF corresponding to SF #5 is SF #k.

FIG. 16(A) illustrates an example using the method A-1 when the SF-skipping method is applied. According to the method A-1, the multi-SF window directed to A/N feedback may be configured with SFs #1, 2, 4, and 5, and a legacy A/N feedback configuration/transmission method may be applied to SF #3 (or a data signal that is single-SF scheduled therethrough). Accordingly, A/N feedback with respect to SFs #1, 2, 4, and 5 that belong to the multi-SF window directed to A/N feedback may be transmitted in UL SF #k corresponding to a last SF, SF #5, and A/N feedback with respect to SF #3 may be transmitted in UL SF #n.

FIG. 16(B) illustrates an example using the method A-2 when the SF-skipping method is applied. According to the method A-2, the multi-SF window directed to A/N feedback may be configured with all SFs that also include SF #3, that is, SFs #1, 2, 3, 4, and 5. Accordingly, A/N feedback with respect to the multi-SF window directed to A/N feedback may be transmitted in UL SF #k corresponding to a last SF, SF #5 in the multi-SF window.

When the multi-SF window directed to multi-SF scheduling is configured based on a SF-omitting method, the multi-SF window directed to A/N feedback may be determined according to one of the following methods.

B-1) Like the multi-SF window directed to multi-SF scheduling, the multi-SF window directed to A/N feedback may be configured with the remaining K or less consecutive SFs except for the special X-SF from a starting SF from a starting SF. A legacy A/N feedback configuration/transmission method corresponding to a single SF may be applied to the excluded special X-SF. In addition, an indicated O-SF may also be excluded from the multi-SF window directed to A/N feedback and a legacy A/N feedback/transmission method corresponding to a single SF may be applied to the indicated O-SF.

B-2) The multi-SF window directed to A/N feedback may be configured with K consecutive SFs from a starting SF to the special X-SF excluded from the multi-SF window directed to the multi-SF scheduling. In this case, the indicated O-SF may also be included in the multi-SF window directed to A/N feedback and an A/N response corresponding to the corresponding indicated O-SF (and/or the omitted special X-SF) may be determined according to a legacy A/N feedback method corresponding to a single SF. For example, when there is no detection/reception of separate single-SF DCI for scheduling a corresponding SF or a data signal scheduled by single subframe DCI is not received, an A/N response corresponding to the indicated O-SF (and/or the omitted special X-SF) may be processed as DTX or NACK.

In the case of the above method B-1 or B-2, A/N transmission timing may be determined as a UL subframe corresponding to a last SF (or a last SF in which a data signal is transmitted in the multi-SF window directed to A/N feedback) included in the multi-SF window directed to A/N feedback. For example, when a last SF of a multi-SF window corresponds to an indicated O-SF or a special X-SF, the last SF of the multi-SF window directed to A/N feedback may be a second last SF of the multi-SF window.

FIG. 17 illustrates an A/N feedback transmitting method according to the present invention. FIG. 17 assumes, but is not limited to, an example in which K=4 and a starting is SF #1. In addition, assuming that SPS based PDSCH scheduling is reserved in SF #4, SF #4 may be a special X-SF. In addition, it is assumed that a UL SF corresponding to SF #3 is SF #n and a UL SF corresponding to SF #4 is SF #k.

FIG. 17(A) illustrates an example using the method B-1 when the SF-omitting method is applied. According to the method B-1, the multi-SF window directed to A/N feedback may be configured with SFs #1, 2, and 3 and a legacy A/N feedback configuration/transmission method may be applied to SF #4 (or a data signal that is single-SF scheduled therethrough). Accordingly, A/N feedback with respect to SFs #1, 2, and 3 that belong to the multi-SF window directed to A/N feedback may be transmitted in UL SF #n and A/N feedback with respect to SF #4 may be transmitted in UL SF #k.

FIG. 17(B) illustrates an example using the method B-2 when the SF-omitting method is applied. According to the method B-2, the multi-SF window directed to A/N feedback may be configured with all SFs that also include SF #4, that is, SFs #1, 2, 3, and 4. In this case, A/N transmission timing may be determined as UL SF #k corresponding to a last SF #4 in the multi-SF window.

A/N feedback with respect to the multi-SF window directed to A/N feedback may be multiplexed to be transmitted in one UL SF. A multiplexing method of A/N feedback according to the present invention may be one of the following methods.

C-1) Subframe (and/or codeword (CW)) bundling (briefly, bundling)

According to this method, a logical AND result with respect to an A/N response corresponding to K SFs (or data signals) of a multi-SF window is transmitted using PUCCH format 1a/1b. For example, subframe bundling may be applied for each transport block (TB) to configure final 2-bit (1-bit per TB) A/N. As another example, logical AND may be applied between A/N responses corresponding to respective TBs to configure final 1-bit A/N. In this case, bundling may be applied to all subframes and codewords.

An A/N transmission resource for bundling-based A/N feedback may be determined as an implicit PUCCH resource linked to a multi-SF DCI. Alternatively, the A/N transmission resource for bundling-based A/N feedback may be determined as a PUCCH resource corresponding to an index obtained by adding specific offset to a corresponding PUCCH index. In this case, the specific offset may be signaled through a corresponding multi-SF DCI or signaled through high layer signaling (e.g., RRC signaling) or the like. Alternatively, the A/N transmission resource for bundling-based A/N feedback may be allocated as an explicit PUCCH resource that is predetermined through high layer signaling (e.g., RRC signaling) or the like. For example, for bundling-based A/N feedback, while a plurality of explicit PUCCH resources are predetermined through high layer signaling (e.g., RRC signaling) or the like, a resource used for A/N transmission among the corresponding resources may be signaled through the multi-SF DCI. In this case, signaling information received through the multi-SF DCI may be referred to as an ACK/NACK resource indicator (ARI). In addition, for example, signaling for determining an A/N transmission resource may also be provided through the multi-SF DCI for scheduling a multi-SF window on PCell.

C-2) Channel Selection (briefly, CHsel)

According to this method, a plurality of PUCCHs format 1b-based channel selection method (to which codeword (CW) bundling is applied) may be applied to K SFs corresponding to the multi-SF window to perform A/N transmission. For example, first, an A/N response corresponding to a first initial SF (or data signal) included in the multi-SF window may be allocated as HARQ-ACK(0) on CHsel mapping. In this case, an A/N response corresponding to a last $K^{th}$ SF (or data signal) may be allocated as HARQ-ACK (K−1) (e.g., refer to Tables 7 to 10).

A plurality of PUCCH resources for channel selection (CHsel)-based A/N feedback may be allocated as only a plurality of implicit PUCCH resources linked to a multi-SF DCI or allocated as a combination of (one or two) implicit PUCCH resources and an explicit PUCCH resource set (configured with a plurality of resources) that is predetermined via high layer signaling (e.g., RRC signaling) or the like. In this case, the implicit PUCCH resource may be determined as a PUCCH resource corresponding to an index obtained by adding specific offset to a PUCCH index, and the specific offset may be signaled via a multi-SF DCI or high layer signaling (e.g., RRC signaling) or the like.

Alternatively, a plurality of PUCCH resources for channel selection (CHsel)-based A/N feedback may be allocated to only an explicit PUCCH resource set (configured with a plurality of resources). In this case, while a plurality of explicit PUCCH resource sets are predetermined through high layer signaling (e.g., RRC signaling) or the like, a resource set used for channel selection (CHsel)-based A/N transmission among a plurality of resource sets may also be signaled through the multi-SF DCI. In this case, signaling information received through the multi-SF DCI may be referred to as an ACK/NACK resource indicator (ARI). In addition, for example, signaling for determining an A/N transmission resource may also be provided through the multi-SF DCI for scheduling a multi-SF window on PCell.

C-3) PUCCH format 3 (briefly, PF3)

According to this method, an A/N payload configured with an A/N response corresponding to K SFs (or data signals) of the multi-SF window is transmitted using PUCCH format 3. For example, first, an A/N response corresponding to a first initial SF (or data signal) included in the multi-SF window may be mapped to a most significant bit (MSB) on the PF3 payload. An A/N response corresponding to a last $K^{th}$ SF (or data signal) may be mapped to a least significant bit (LSB).

In the case of PF3-based A/N feedback, while a plurality of PF3 resources are predetermined via high layer signaling (e.g., RRC signaling) or the like, a resource used for A/N transmission among a plurality of resources may also be signaled through the multi-SF DCI. In this case, signaling information received through the multi-SF DCI may be referred to as an ACK/NACK resource indicator (ARI). For example, signaling (e.g., ARI) for determining an A/N resource transmission may also be provided through a multi-SF DCI (e.g., in the case of a TDD system) corresponding to an initial value (e.g., 1) of DAI while scheduling a multi-SF DCI (e.g., in the case of a FDD system) for scheduling a multi-SF window on PCell or the multi-SF window on PCell. As another example, when multi-SF scheduling is configured/applied, A/N feedback transmission corresponding thereto may be limited to be performed using only PF3.

The TDD system may have a configuration in which an A/N response corresponding to a plurality of data signals received through M DL SFs (referred to as a "TDD window") is transmitted through one UL SF. In addition, a DAI that indicates DCI for scheduling each data signal in a TDD window, that is, a transmission order of the DCI for scheduling the data signal may be signaled.

In this TDD situation, when multi-SF scheduling is applied, misalignment between an eNB and a UE (on an A/N feedback configuration) may occur due to (multi-SF) DCI detection/reception failure. To prevent this, DAI values from N to N+K−1 may be sequentially matched to K SFs (or data signals) scheduled from a multi-SF DCI corresponding to DAI=N. For example, when data signals from SF #1 to SF #K are scheduled through the multi-SF DCI corresponding to DAI=N, DAI=N may correspond to SF #1 (or a data signal transmitted therethrough) and DAI=N+1 may correspond to SF #2, . . . , and DAI=N+K−1 may correspond to SF #K. In this case, (in the same TDD window) a DAI value corresponding to DCI that is transmitted immediately after the multi-SF DCI may be signaled to N+K.

As another method, a DAI included in the multi-SF DCI may be defined as an order value that indicates a scheduling order of a first initial data signal scheduled by each DCI (among data signals scheduled based on DCI) in a TDD window. That is, the DAI may be defined as a scheduling order value of a first initial data signal scheduled by the corresponding DCI (among signals scheduled based on DCI in a TDD window).

As another method, during configuration of multi-SF scheduling, DL DAI (and/or UL DAI) may not be signaled/used (in this case, a corresponding field may be fixed to a specific value (e.g., zero padding)) or may be ignored. Alternatively, configuration of multi-SF scheduling, a DL DAI (and/or UL DAI) field may be used for another purpose or may not be configured. In this case, in order to prevent misalignment between an eNB and a UE (on an A/N feedback configuration), an A/N response corresponding to the multi-SF window may be disposed on an LSB on a whole A/N payload.

In a TDD system, a multi-SF window may be configured/set to be included in a TDD window. In this case, a subframe (or a data signal) included in the TDD window may include a subframe (or a data signal) included in the multi-SF window. For example, K corresponding to the multi-SF window may be set to be equal to or less than M (refer to the description of Table 5) corresponding to the TDD window. Alternatively, the multi-SF window may be configured/set to include a plurality of TDD windows. In this case, a subframe (or a data signal) included in the multi-SF window may include a subframe (or a data signal) included in the TDD window. For example, K corresponding to the multi-SF window may be set to be a multiple of M corresponding to the TDD window. For example, K corresponding to the multi-SF window may be set to be equal to M corresponding to the TDD window or a multiple of M, a subframe for transmission/reception of the multi-SF DCI may be configured as a first subframe included in the TDD window.

In a carrier aggregation (CA) situation, when multi-SF scheduling is configured/applied in a specific cell, misalignment between an eNB and a UE (on an A/N feedback configuration) may occur due to (multi-SF DCI) detection/reception failure. To prevent this, an A/N payload/codebook size for A/N feedback configuration, that is, the number of SFs as a target of A/N feedback may be determined assuming a state in which multi-SF scheduling is performed.

FIG. 18 illustrates an A/N transmitting method when a plurality of cells are carrier-aggregated (CA) according to the present invention. FIG. 18 illustrates, but is not limited to, an example in which multi-SF scheduling is configured/applied only to cell 1 (e.g., PCell) among cell 1 (e.g., PCell) and cell 2 (e.g., SCell) in a CA situation between two FDD cells and is configured in such a way that K corresponding to the multi-SF window is given as 4 (H=1 and S=0) and multi-SF DCI detection/reception can be detected/received thorough only SF #1 and SF #6.

In the example of FIG. 18, A/N feedback (transmitted through each of SFs 4, 5, 6, and 7 and SFs #9, 10, 11, and 12) corresponding to each of SFs #0, 1, 2, and 3 and SFs #5, 6, 7, and 8 may be configured with an A/N signal with respect to one SF of cell 1 (e.g., PCell) and one SF of cell 2 (e.g., SCell). On the other hand, in this example, assuming that A/N feedback is transmitted through a UL SF corresponding to a last subframe of a multi-SF window, A/N feedback (transmitted through each of SF #8 and SF #13) corresponding to each of SF #4 and SF #9 may be configured with an A/N signal with respect to four SFs (i.e., SFs #1 to #4 and SFs #6 to #9 that can be a target of multi-SF scheduling) of cell 1 (e.g., PCell) and one SF (i.e., SF #4 and SF #9) of cell 2 (e.g., SCell) (refer to FIG. 18(A)). In this situation, when a single-SF DCI instead of a multi-SF DCI is detected/received through an SF (e.g., SF #1 or SF #6) configured to detect/receive the multi-SF DCI, A/N with respect to an SF (or a data signal) corresponding to a single-SF DCI may be mapped to a position corresponding to a first initial SF (e.g., SF #1 or #6) in a multi-SF window (e.g., SF #1 to #4 or SF #6 to #9) as a target of A/N feedback corresponding to the corresponding multi-SF DCI (refer to FIG. 18(A)). As another method, when a single-SF DCI is detected/received through an SF (e.g., SF #1 or SF #6) configured to detect/receive the multi-SF DCI, an A/N feedback configuration/transmission operation applied to a plurality of cell. CA based on single-SF scheduling may be performed like in a prior art (refer to FIG. 18(B)).

In addition, when A/N feedback transmission timing corresponding to a multi-SF window scheduled through cell 1 and a single-SF scheduled through cell 2 is defined/ configured as the same SF (and/or when cells for transmission of A/N feedback are defined/configured as the same cell), an ARI in a multi-SF DCI for scheduling a multi-SF window of cell 1 and an ARI in a single-SF DCI of cell 2 may have the same value. That is, the UE may be operated while assuming/considering that ARIs have the same value.

Alternatively, when A/N feedback transmission timing corresponding to a multi-SF window scheduled through cell 1 and a multi-SF window (having the same/different size from cell 1) scheduled through cell 2 is defined/configured as the same SF (and/or when cells for transmission of A/N feedback are defined/configured as the same cell), an ARI in a multi-SF DCI for scheduling a multi-SF window of cell 1 and an ARI in a multi-SF DCI for scheduling a multi-SF window of cell 2 may have the same value.

Accordingly, when the multi-SF DCI for scheduling cell 1 and a single-SF DCI (or a multi-SF DCI) for scheduling cell 2 are transmitted/received through the same SF, ARIs signaled from corresponding DCIs may have the same value or different values. In this case, corresponding A/N feedback transmission timing may be different.

For example, ARIs signaled through a multi-SF DCI for scheduling cell 1 in SF #1 and a single-SF DCI for scheduling cell 2 in SF #4 may always have the same value. Similarly, ARIs signaled through a multi-SF DCI for scheduling cell 1 in SF #6 and signaled through a single-SF DCI for scheduling cell 2 in SF #9 may always have the same value. As another example, ARIs signaled through a multi-SF DCI for scheduling cell 1 in SF #1 and a single-SF DCI for scheduling cell 2 in SF #1 may have the same value or different values. Similarly, ARIs signaled through a multi-SF DCI for scheduling cell 1 in SF #6 and signaled through a single-SF DCI for scheduling cell 2 in SF #6 may have the same value or different values.

Although the above description has been given in terms of a DL DAI, the present invention can also be applied to a UL DAI in the same or similar way. For example, a UL DAI included in a multi-SF DCI for UL multi-SF scheduling may be restrictedly applied only to a first initial UL SF (a PUSCH transmitted therethrough) included in a multi-SF window corresponding to the corresponding DCI, and the UE may be operated while assuming that a UL DAI value is equal to M or an (equivalently) corresponding UL DAI is not present with respect to other remaining UL SFs (in a corresponding multi-SF window).

Some (e.g., A/N transmission timing and resource) of the methods proposed according to the present invention may also be applied in the same/similar way to a situation applying a multi-SF scheduling method in which one DL/UL data signal (e.g., the same data signal) scheduled from one DL/UL grant DCI is repeatedly transmitted over a plurality of specific DL/UL SFs in order to enhance cell coverage.

Figure 19:
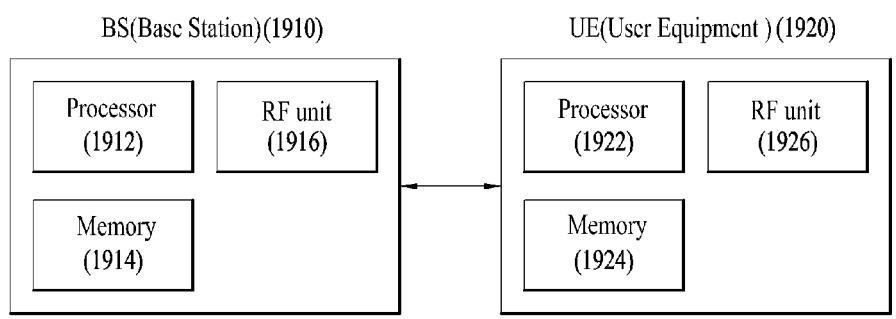
FIG. 19 illustrates a base station and a user equipment to which the present invention is applicable.

FIG. 19 illustrates a base station and a user equipment to which the present invention is applicable.

Referring to FIG. 19, a wireless communication system includes the BS 1910 and the UE 1920. When the wireless communication system includes a relay, the BS 1910 or the UE 1920 may be replaced with the relay.

The BS 1910 includes a processor 1912, a memory 1914, and a radio frequency (RF) unit 1916. The processor 1912 may be configured to embody the procedures and/or methods proposed by the present invention. The memory 1914 is connected to the processor 1912 and stores various pieces of information associated with an operation of the processor 1912. The RF unit 1916 is connected to the processor 1912 and transmits/receives a radio signal. The UE 1920 includes a processor 1922, a memory 1924, and an RF unit 1926. The processor 1922 may be configured to embody the procedures and/or methods proposed by the present invention. The memory 1924 is connected to the processor 1922 and stores various pieces of information associated with an operation of the processor 1922. The RF unit 1926 is connected to the processor 1922 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

The invention claimed is:
1. A method for transmitting a signal by a user equipment in a wireless communication system, the method comprising:

receiving a plurality of data signals in a plurality of subframes; and transmitting an acknowledgement (ACK)/negative ACK (HACK) signal in response to the plurality of data signals, wherein, when a first data signal of the plurality of data signals is received in a specific subframe and a second data signal of the plurality of data signals is received in a subframe other than the specific subframe, an ACK/NACK signal for the first data signal and an ACK/NACK signal for the second data signal are transmitted in different uplink subframes, wherein, when the wireless communication system is a time division duplex (TDD) system, an ACK/NACK signal for M data signals received in M downlink subframes is transmitted in one uplink subframe, and the M data signals comprise the plurality of data signals, and wherein a downlink association index (DAI) value included in downlink control information for scheduling the plurality of data signals indicates an order of an initial data signal of the plurality of data signals within the M data signals.

2. The method according to claim 1, wherein the specific subframe comprises at least a subframe configured for a multicast-broadcast single-frequency network (MBSFN), or a subframe configured to receive a physical multicast channel (PMCH), or a subframe configured to transmit a positioning reference signal (PRS), or a subframe comprising a downlink period, a guard period, and an uplink period, or a subframe for transmitting a physical broadcast channel (PBCH) signal, or a subframe configured to transmit system information, or a subframe configured to transmit a paging signal, or a subframe configured to transmit a synchronization signal, or a subframe configured to perform semi-persistent scheduling, or a subframe configured to be available for physical random access channel (PRACH) transmission, or a subframe configured not to transmit demodulation reference signal (DMRS), or a subframe configured to transmit a channel state information-reference signal (CSI-RS).

3. The method according to claim 1, wherein, when a number of ACK/NACK signals for the second data signal is greater than one, the ACK/NACK signals for the second data signal are represented as one bit through a logical AND operation.

4. The method according to claim 1, wherein, when a number of ACK/NACK signals for the second data signal is greater than one, the ACK/NACK signals for the second data signal are transmitted using a channel selection scheme, and each of the ACK/NACK signals for the second data signal is allocated from hybrid automatic repeat request-ACK (HARQ-ACK)(0) of a channel selection mapping table.

5. The method according to claim 4, wherein, when the number of ACK/NACK signals for the second data signal is two, the channel selection mapping table is given according to given according to the following table:

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | | where $n_{PUCCH,i}^{(1)}$ represents a physical uplink control channel (PUCCH) resource index corresponding to an $i^{th}$ PUCCH resource, and b(0)b(1) represents bit values corresponding to a complex modulation value.

6. The method according to claim 4, wherein, when the number of ACK/NACK signals for the second data signal is three, the channel selection mapping table is given according to given according to the following table:

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | | where $n_{PUCCH,i}^{(1)}$ represents a physical uplink control channel (PUCCH) resource index corresponding to an $i^{th}$ PUCCH resource, and b(0)b(1) represents bit values corresponding to a complex modulation value.

7. The method according to claim 4, wherein, when the number of ACK/NACK signals for the second data signal is four, the channel selection mapping table is given according to given according to the following table:

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | | where $n_{PUCCH,i}^{(1)}$ represents a physical uplink control channel (PUCCH) resource index corresponding to an $i^{th}$ PUCCH resource, and b(0)b(1) represents bit values corresponding to a complex modulation value.

8. The method according to claim 4, wherein a resource for the ACK/NACK signals for the second data signal is determined using a physical uplink control channel (PUCCH) resource linked to downlink control information for scheduling the plurality of data signals or a PUCCH resource set predetermined through high layer signaling.

9. The method according to claim 1, wherein:
when a number of ACK/NACK signals for the second data signal is greater than one, the ACK/NACK signals for the second data signal are transmitted using physical uplink control channel (PUCCH) format 3, and each of the ACK/NACK signals for the second data signal is allocated from a most significant bit (MSB) of a payload of the PUCCH format 3.

10. The method according to claim 9, wherein a resource for the ACK/NACK signals in response to the second data signal is signaled through downlink control information for scheduling the plurality of data signals on a primary cell when the wireless communication system is a frequency division duplex (FDD) system, and is signaled through downlink control information with a DAI value of 1 and scheduling the plurality of data signals on the primary cell when the wireless communication system is the TDD system.

11. The method according to claim 1, wherein, when the wireless communication system is the TDD system, an ACK/NACK signal for M data signals received in M downlink subframes is transmitted in one uplink subframe, and a number of the plurality of data signals is a multiple of M.

12. The method according to claim 1, wherein, when a number of the plurality of data signals is K and the DAI value included in the downlink control information for scheduling the plurality of data signals is N, a DAI value for the plurality of data signals is given from N to N+K−1.

13. A user equipment in a wireless communication system, the user equipment comprising:
a radio frequency (RF) unit; and
a processor, wherein the processor is configured to:
receive a plurality of data signals in a plurality of subframes through the RF unit, and
transmit an acknowledgement (ACK)/negative ACK (NACK) signal in response to the plurality of data signals through the RF unit,
wherein, when a first data signal of the plurality of data signals is received in a specific subframe and a second data signal of the plurality of data signals is received in a subframe other than the specific subframe, an ACK/NACK signal for the first data signal and an ACK/NACK signal for the second data signal are transmitted in different uplink subframes,
wherein, when the wireless communication system is a time division duplex (TDD) system, an ACK/NACK signal for M data signals received in M downlink subframes is transmitted in one uplink subframe, and the M data signals comprise the plurality of data signals, and
wherein a downlink association index (DAI) value included in downlink control information for scheduling the plurality of data signals indicates an order of an initial data signal of the plurality of data signals within the M data signals.

14. The user equipment according to claim 13, wherein the specific subframe comprises at least a subframe configured for a multicast-broadcast single-frequency network (MBSFN), or a subframe configured to receive a physical multicast channel (PMCH), or a subframe configured to transmit a positioning reference signal (PRS), or a subframe comprising a downlink period, a guard period, and an uplink period, or a subframe for transmitting a physical broadcast channel (PBCH) signal, or a subframe configured to transmit system information, or a subframe configured to transmit a paging signal, or a subframe configured to transmit a synchronization signal, or a subframe configured to perform semi-persistent scheduling, or a subframe configured to be available for physical random access channel (PRACH) transmission, or a subframe configured not to transmit demodulation reference signal (DMRS), or a subframe configured to transmit a channel state information-reference signal (CSI-RS).

15. The user equipment according to claim 13, wherein, when a number of ACK/NACK signals for the second data signal is greater than one, the ACK/NACK signals for the second data signal are represented as one bit through a logical AND operation.

16. The user equipment according to claim 13, wherein, when a number of ACK/NACK signals for the second data signal is greater than one, the ACK/NACK signals for the second data signal are transmitted using a channel selection scheme, and each of the ACK/NACK signals for the second data signal is allocated from hybrid automatic repeat request-ACK (HARQ-ACK)(0) of a channel selection mapping table.

17. The user equipment according to claim 16, wherein, when the number of ACK/NACK signals for the second data signal is two, the channel selection mapping table is given according to given according to the following table:

| HARQ-ACK(0), HARQ-ACK(1) | $n_{PUCCH}^{(1)}$ | b(0)b(1) |
|---|---|---|
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | | No Transmission | where $n_{PUCCH,i}^{(1)}$ represents a physical uplink control channel (PUCCH) resource index corresponding to an $i^{th}$ PUCCH resource, and b(0)b(1) represents bit values corresponding to a complex modulation value.

18. The user equipment according to claim 16, wherein, when the number of ACK/NACK signals for the second data signal is three, the channel selection mapping table is given according to given according to the following table:

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | | No Transmission | where $n_{PUCCH,i}^{(1)}$ represents a physical uplink control channel (PUCCH) resource index corresponding to an $i^{th}$ PUCCH resource, and b(0)b(1) represents bit values corresponding to a complex modulation value.

19. The user equipment according to claim 16, wherein, when the number of ACK/NACK signals for the second data signal is four, the channel selection mapping table is given according to given according to the following table:

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |

-continued

| HARQ-ACK(0), HARQ-ACK(1), HARQ-ACK(2), HARQ-ACK(3) | $n_{PUCCH}^{(1)}$ | b(0)b(1) |
|---|---|---|
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | | where $n_{PUCCH,i}^{(1)}$ represents a physical uplink control channel (PUCCH) resource index corresponding to an $i^{th}$ PUCCH resource, and b(0)b(1) represents bit values corresponding to a complex modulation value.

20. The user equipment according to claim 16, wherein a resource for the ACK/NACK signals for the second data signal is determined using a physical uplink control channel (PUCCH) resource linked to downlink control information for scheduling the plurality of data signals or a PUCCH resource set predetermined through high layer signaling.

* * * * *